United States Patent [19]
Tanaka et al.

[11] Patent Number: 5,949,226
[45] Date of Patent: Sep. 7, 1999

[54] DC/DC CONVERTER WITH REDUCED POWER CONSUMPTON AND IMPROVED EFFICIENCY

[75] Inventors: Hiroto Tanaka; Shinobu Aoki, both of Aichi, Japan

[73] Assignee: Kabushiki Kaisha Toyoda Jidoshokki Seisakush, Aichi-Ken, Japan

[21] Appl. No.: 08/629,573

[22] Filed: Apr. 9, 1996

[30] Foreign Application Priority Data

| Apr. 10, 1995 | [JP] | Japan | 7-083961 |
|---|---|---|---|
| Apr. 13, 1995 | [JP] | Japan | 7-088170 |
| Apr. 19, 1995 | [JP] | Japan | 7-093979 |

[51] Int. Cl.$^6$ .................................................. G05F 1/40
[52] U.S. Cl. ........................................ 323/285; 323/283
[58] Field of Search ................................ 323/282, 284, 323/349–351, 273–274, 222, 303, 285, 283; 327/538; 363/20–23, 19–25

[56] References Cited

U.S. PATENT DOCUMENTS

| 3,458,798 | 7/1969 | Fang et al. . | |
| 3,579,091 | 5/1971 | Clarke et al. . | |
| 3,582,758 | 6/1971 | Gunn . | |
| 4,071,884 | 1/1978 | Maigret . | |
| 4,107,596 | 8/1978 | Weaver et al. . | |
| 4,146,832 | 3/1979 | McConnell | 323/285 |
| 4,309,650 | 1/1982 | Boros et al. | 323/283 |
| 4,395,675 | 7/1983 | Toumani . | |
| 4,428,015 | 1/1984 | Nesler . | |
| 4,456,872 | 6/1984 | Froeschle | 323/286 |
| 4,479,174 | 10/1984 | Cates | 363/21 |
| 4,519,024 | 5/1985 | Federico et al. . | |
| 4,578,630 | 3/1986 | Grosch . | |
| 4,610,521 | 9/1986 | Inoue | 354/145.1 |
| 4,634,956 | 1/1987 | Davis et al. | 323/222 |
| 4,672,303 | 6/1987 | Newton . | |
| 4,716,514 | 12/1987 | Patel . | |
| 4,727,308 | 2/1988 | Huljak et al. . | |
| 4,801,859 | 1/1989 | Dishner . | |
| 4,819,122 | 4/1989 | Gontowski, Jr. . | |
| 4,823,070 | 4/1989 | Nelson | 323/285 |
| 4,843,532 | 6/1989 | Freedman . | |
| 4,884,183 | 11/1989 | Sable . | |
| 4,922,404 | 5/1990 | Ludwig et al. . | |
| 4,928,200 | 5/1990 | Redl et al. . | |

(List continued on next page.)

FOREIGN PATENT DOCUMENTS

| 0428377 A2 | 5/1991 | European Pat. Off. . |
| U57-98185 | 12/1980 | Japan . |
| U57-156920 | 3/1981 | Japan . |
| U58-183084 | 12/1983 | Japan . |
| U60-89784 | 6/1985 | Japan . |
| A60-156269 | 8/1985 | Japan . |
| A2-174555 | 7/1990 | Japan . |
| A3-124260 | 5/1991 | Japan . |
| 3113986 | 11/1991 | Japan . |
| U3-113986 | 11/1991 | Japan . |
| 442771 | 2/1992 | Japan . |
| A4-42771 | 2/1992 | Japan . |
| U4-101286 | 9/1992 | Japan . |
| U5-11789 | 2/1993 | Japan . |

Primary Examiner—Shawn Riley
Attorney, Agent, or Firm—Morgan & Finnegan, L.L.P.

[57] ABSTRACT

A comparator monitors an output voltage $V_{out}$. When an output voltage $V_{out}$ decreases to a predetermined output voltage or less, the comparator sends a signal that represents this state to a controlling circuit. When the controlling circuit receives the signal, it causes a switching device to be turned on. Thus, a coil current $I_L$ is increased. A hysteresis (window) comparator monitors the coil current $I_L$. When the coil current $I_L$ reaches a comparison current $I_{LP}$, the controlling circuit causes the switching device to be turned off. When the coil current $I_L$ decreases to the comparison current $I_{LB}$ (where $I_{LP}>I_{LB}$), the controlling circuit references an output signal of the comparator. When the output voltage $V_{out}$ is lower than the predetermined output voltage, the controlling circuit causes the switching device to be turned on.

36 Claims, 21 Drawing Sheets

U.S. PATENT DOCUMENTS

| | | |
|---|---|---|
| 4,929,882 | 5/1990 | Szepesi . |
| 4,931,716 | 6/1990 | Jovanovic et al. . |
| 5,028,861 | 7/1991 | Pace et al. . |
| 5,097,196 | 3/1992 | Schoneman . |
| 5,144,547 | 9/1992 | Masamoto . |
| 5,170,333 | 12/1992 | Niwayama ............................ 363/21 |
| 5,193,211 | 3/1993 | Nobusawa . |
| 5,237,606 | 8/1993 | Ziermann . |
| 5,336,985 | 8/1994 | McKenzie . |
| 5,396,412 | 3/1995 | Barlage . |
| 5,481,178 | 1/1996 | Wilcox et al. ......................... 323/287 |
| 5,498,995 | 3/1996 | Szepesi et al. . |
| 5,552,695 | 9/1996 | Schwartz . |
| 5,565,762 | 10/1996 | Ishikawa et al. ..................... 323/222 |
| 5,572,112 | 11/1996 | Saeki et al. .......................... 323/282 |

FIG. 6A SWITCHING DEVICE ACCORDING TO EMBODIMENT
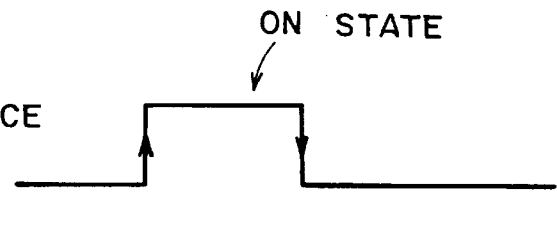
COIL CURRENT ACCORDING TO EMBODIMENT
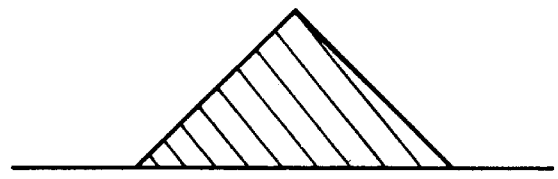
FIG. 6B SWITCHING DEVICE ACCORDING TO PFM METHOD
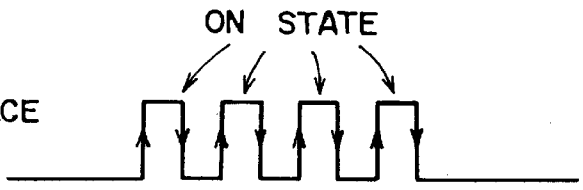
COIL CURRENT ACCORDING TO PFM METHOD
↑ : TURN – ON
↓ : TURN – OFF
※ AREA IN HATCHED PORTION REPRESENTS POWER

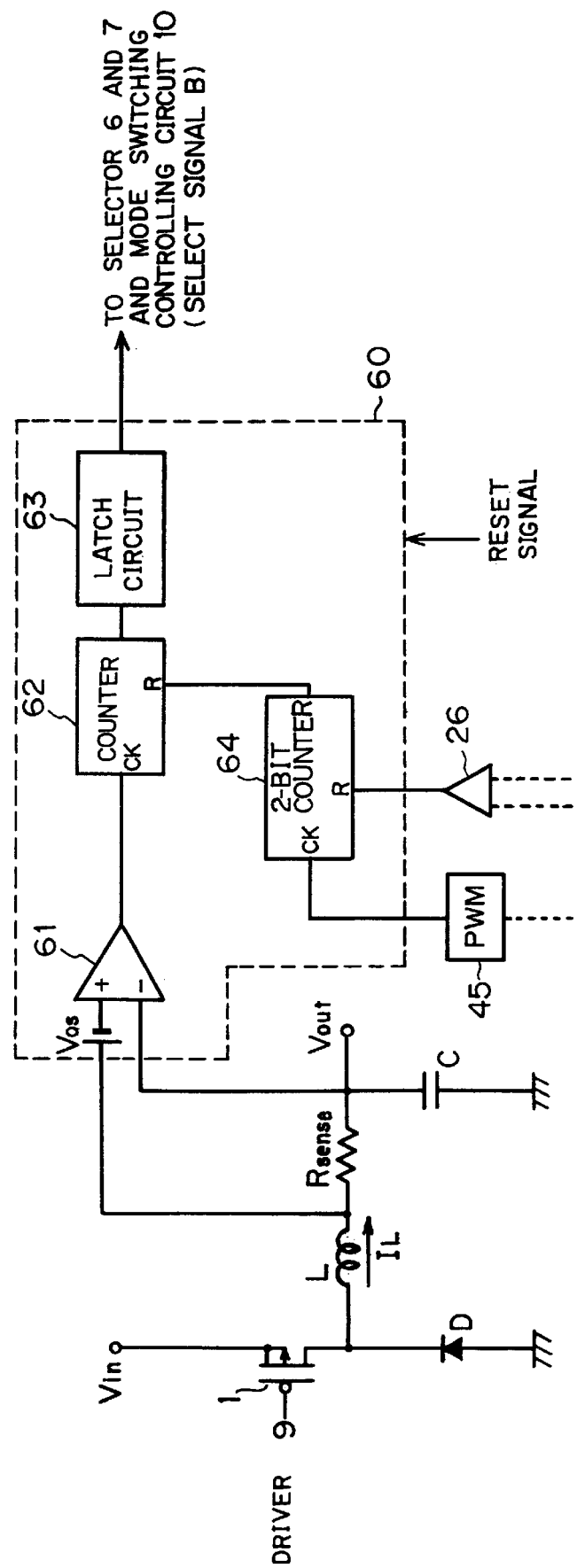
F I G. 20

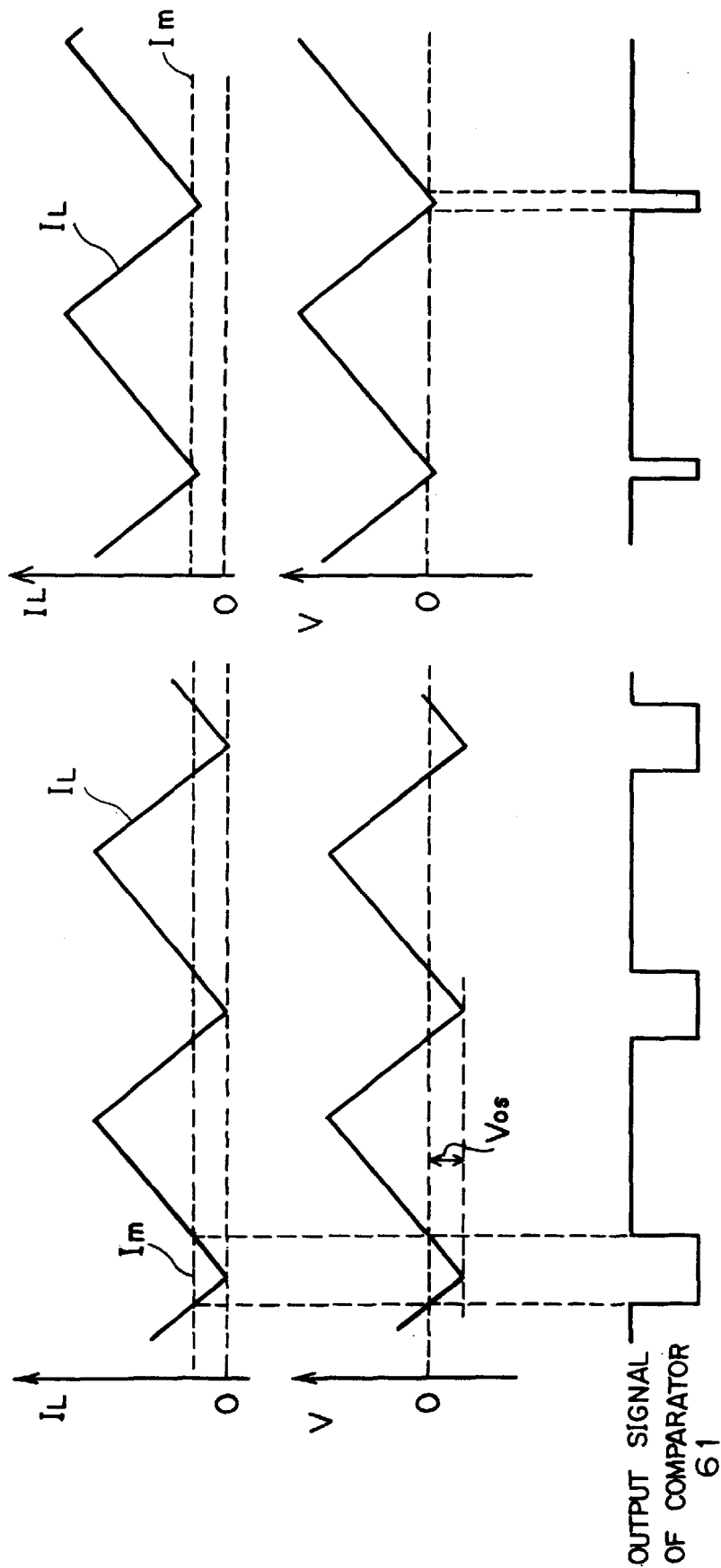

DC/DC CONVERTER WITH REDUCED POWER CONSUMPTON AND IMPROVED EFFICIENCY

BACKGROUND OF THE INVENTION

1. Field of the Invention

The present invention relates to a DC/DC converter, in particular, to a technology for reducing the power consumption of a DC/DC converter and for improving the converting efficiency.

2. Description of the Related Art

A DC/DC converter is an apparatus that converts a particular DC input voltage into another DC voltage and outputs the converted DC voltage. The DC/DC converter is used for various systems. The output voltage of the DC/DC converter should be free from fluctuation. When the DC/DC converter is installed in a portable terminal or the like, the power consumption of the DC/DC converter should be as small as possible.

FIG. 1 is a circuit diagram showing a structure of a conventional DC/DC converter. The DC/DC converter shown in FIG. 1 converts an input voltage $V_{in}$ into an output voltage $V_{out}$. The DC/DC converter controls the power to be supplied to a load corresponding to a PFM (pulse frequency modulation) method. In the PFM system, when the load requires a high current, the pulse frequency (pulse generating frequency) is increased. When the load does not require a high current, the pulse frequency is decreased.

A pulse frequency modulator 1 receives the output signal $V_{out}$ as a feedback signal and outputs a pulse signal for causing a switching device 3 to be turned on with a pulse frequency corresponding to the voltage $V_{out}$. A driver 2 turns on the switching device 3 for a predetermined time period whenever the driver 2 receives the pulse signal from the pulse frequency modulator 1. The switching device 3 is turned on or off corresponding to an on/off control signal received from the driver 2. The switching device 3 is composed of, for example, a P-channel type MOS transistor. When the signal level of the output signal of the driver 2 is "L", the switching device 3 is turned on.

When the switching device 3 is turned on, a current flows from the switching device 3 to a condenser C through a coil L. An electrical charge is stored in the condenser C and thereby the output voltage $V_{out}$ increases. Thus, when the output voltage $V_{out}$ decreases to a designated voltage or less, the pulse frequency modulator 1 increases the pulse frequency and thereby increases the number of pulses for turning on the switching device 3. On the other hand, when the output voltage $V_{out}$ increases and exceeds the designated voltage, the pulse frequency modulator 1 decreases the pulse frequency and thereby decreases the number of pulses for turning on the switching device 3. In the PFM method, the output voltage $V_{out}$ is kept constant.

FIGS. 2A, 2B, and 2C are schematic diagrams showing output signals of the pulse frequency modulator 1. In FIGS. 2A, 2B, and 2C, each pulse (a period in the "H" level) causes the switching device 3 to be turned on.

While the load current is small, as shown in FIG. 2A, the pulse frequency of the pulse frequency modulator 1 is relatively low. On the other hand, when the load current increases and the output voltage $V_{out}$ decreases to the designated voltage or less, as shown in FIG. 2B, the pulse frequency modulator 1 increases the pulse frequency. In other words, the frequency with which the switching device 3 is turned on is increased so as to increase the output voltage $V_{out}$. In the PFM method, the output voltage $V_{out}$ is kept constant in such a manner.

When the DC/DC converter is installed in a portable computer or the like, the power consumption of the DC/DC converter should be reduced as much as possible so as to prolong the operation life of the terminal. However, the conventional DC/DC converter cannot satisfactorily reduce the power consumption.

In other words, when the DC/DC converter is installed in a portable computer or the like, the size of the DC/DC converter should be significantly reduced. In this case, the sizes of the condenser C and the coil L should be reduced. However, a frequency of an oscillator should be up to around several 100's of KHz, and as shown in FIG. 2C, a cycle of a pulse operation becomes short, the pulse frequency should be increased in the PFM method.

When the pulse frequency is increased, the amount of current per pulse decreases. Thus, to supply a predetermined amount of current to the load, the number of pulses should be increased. However, since the switching device 3 is turned on and off corresponding to each pulse, when the number of pulses increases, the number of times of the switching operation of the switching device 3 increases. When the switching device 3 is turned on or off, an energy loss results. Thus, the converting efficiency of the DC/DC converter deteriorates.

In the above-described structure, an oscillator 4 is essential (for example, disposed in the pulse frequency modulator 1). The oscillator 4 is always operating. In other words, in the PFM system, the oscillator 4 always oscillates at a predetermined frequency. A part of the pulse signal generated by the oscillator 4 is output as the output signal of the pulse frequency modulator 1. Thus, even if the load current is small and the pulse frequency is low, the oscillator 4 operates as with the case that the load current is large. Although the current consumed by the DC/DC converter should be decreased in proportion to the load current, the current consumed by the oscillator 4 is constant. Thus, even when the load current is small, the current consumed by the DC/DC converter cannot be decreased.

In addition, when the pulse frequency is varied, ripples of the output voltage $V_{out}$ become unstable. Thus, radiation noise takes place and the bandwidth of noise of the power system of the load connected to the DC/DC converter becomes wide. Consequently, it is difficult to remove such noise.

As described above, in the conventional DC/DC converter, the current consumption cannot be satisfactorily reduced and the bandwidth of noise is wide.

SUMMARY OF THE INVENTION

An object of the present invention is to reduce the current consumption of the DC/DC converter and improve the converting efficiency.

The DC/DC converter according to the present invention controls a switching unit so as to vary the coil current and control the output voltage. In addition, the DC/DC converter according to the present invention has at least a heavy load mode and a light load mode as operation modes for supplying a current to a load. To operate the DC/DC converter in the light load mode, the following units are provided.

An output monitoring unit is adapted for monitoring an output value (output voltage) and outputting a first signal when the output value becomes smaller than a reference value. A current monitoring unit is adapted for monitoring a coil current, outputting a second signal when the coil current increases to a first current value, and outputting a third signal when the coil current decreases to a second current value. The first current value is larger than the second current value. A controlling unit is adapted for turning on the switching unit when the first signal is received and for turning off the switching unit when the second signal is received. The controlling unit is adapted for ignoring the first signal that is output from the output monitoring unit after the first signal is received until the third signal is received.

The coil current increases when the first signal is output. The coil current decreases when the second signal is output. The coil current at the time when the third signal is output is equal to the coil current at the timing when the first signal is output. In other words, the period between when the first signal is output and the third signal is output is a cycle of the coil current. The controlling unit ignores the output signal of the output monitoring unit after the controlling unit receives the first signal until it receives the third signal. Thus, the cycle of the coil current is not stopped. In addition, in the middle of a particular cycle of coil current, another cycle does not start.

These and other objects, features and advantages of the present invention will become more apparent in light of the following detailed description of best mode embodiments thereof, as illustrated in the accompanying drawings.

BRIEF DESCRIPTION OF THE DRAWINGS

FIGS. 6A and 6B are schematic diagrams for comparing the method of the embodiment and the conventional PFM method in the case that a predetermined power is supplied to a load;

FIG. 20 is a circuit diagram showing another structure of the DC/DC converter according to the third aspect of the present invention; and FIGS. 21A and 21B are schematic diagrams for explaining an operation of the DC/DC converter shown in FIG. 20.

DESCRIPTION OF THE PREFERRED EMBODIMENTS

Next, with reference to the accompanying drawings, an embodiment of the present invention will be described. A DC/DC converter according to the present invention controls a switching device so as to vary a coil current and control an output voltage. The DC/DC converter has at least a heavy load mode and a light load mode as operation modes for supplying a power to a load connected to the DC/DC converter. When a power is supplied to a light load (namely, the amount of current required by the load is small), the DC/DC converter operates in the light load mode. When a power is supplied to a heavy load (namely, the amount of current required by the load is large), the DC/DC converter operates in the heavy load mode. The operation mode of the DC/DC converter is automatically switched by an internal control.

Next, a first aspect to a third aspect of the present invention will be described. In the first aspect, a structure required for the operation in the light load mode is described. In the second aspect, a structure required for the operation of switching the operation mode from the light load mode to the heavy load mode is described. In the third aspect, a structure required for the operation of switching the operation mode from the heavy load mode to the light load mode is described.

Figure 3:
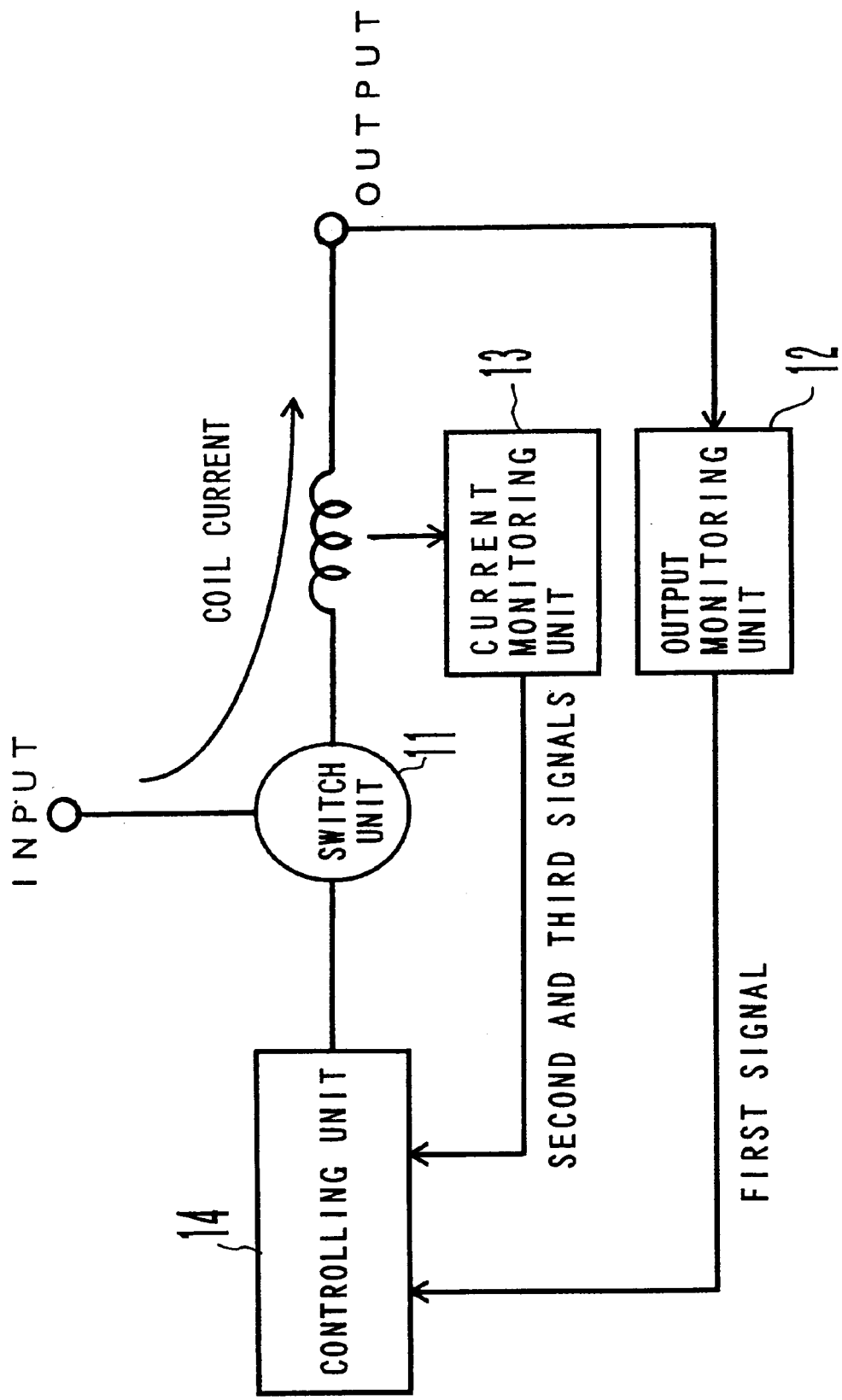
FIG. 3 is a block diagram showing a structure of a DC-DC converter according to a first aspect of the present invention.

FIG. 3 is a block diagram showing a structure of a DC/DC converter according to the first aspect of the present invention. The DC/DC converter according to the first aspect of the present invention controls a switch unit 11 so as to vary a coil current and control an output.

An output monitoring unit 12 monitors an output value (for example, an output voltage) of the DC/DC converter. When the output value decreases to a predetermined reference value or less, the output monitoring unit 12 outputs a first signal. A current monitoring unit 13 monitors a coil current. When the coil current increases to a predetermined first current value, the current monitoring unit 13 outputs a second signal. When the coil current decreases to a predetermined second current value, the current monitoring unit 13 outputs a third signal. In this case, the first current value is larger than the second current value. The second current value is designated as, for example, 0. Each of the output monitoring unit 12 and the current monitoring unit 13 is composed of, for example, a comparator.

When a controlling unit 14 receives the first signal, it determines that a power should be supplied to the load and turns on the switch unit 11 so as to increase the coil current.

Thus, a cycle for supplying the power to the load starts. The controlling unit 14 ignores an output signal from the output monitoring unit 12 after the controlling unit 14 receives the first signal, until it receives the third signal.

When the controlling unit 14 receives the second signal, it determines that the amount of the coil current becomes large and turns off the switch unit 11. When the controlling unit 14 receives the third signal, it determines that the cycle for supplying the power to the load has been finished and waits for the first signal that is a trigger for starting the next power supply cycle.

The power supply cycle is started when the output value of the DC/DC converter decreases to the predetermined reference value. The power supply cycle is finished after the coil current increases to the first current value until the current returns to the second current value. In the period in which the power supply cycle is performed, the first signal, which is a trigger for starting the next power supply cycle, is ignored. Thus, in the middle of a particular power supply cycle, the next power supply cycle is not started. Thus, one power supply cycle is fully and securely performed.

The period of the power supply cycle can be designated by parameters of the first and second current values, or the like, designated for the current monitoring unit 13. Thus, the period of the power supply cycle can be designated so that the power required by the load is supplied with a minimum number of switching operations. Since the power supply cycle is self-oscillating, it is not necessary to provide an oscillator.

Figure 4:
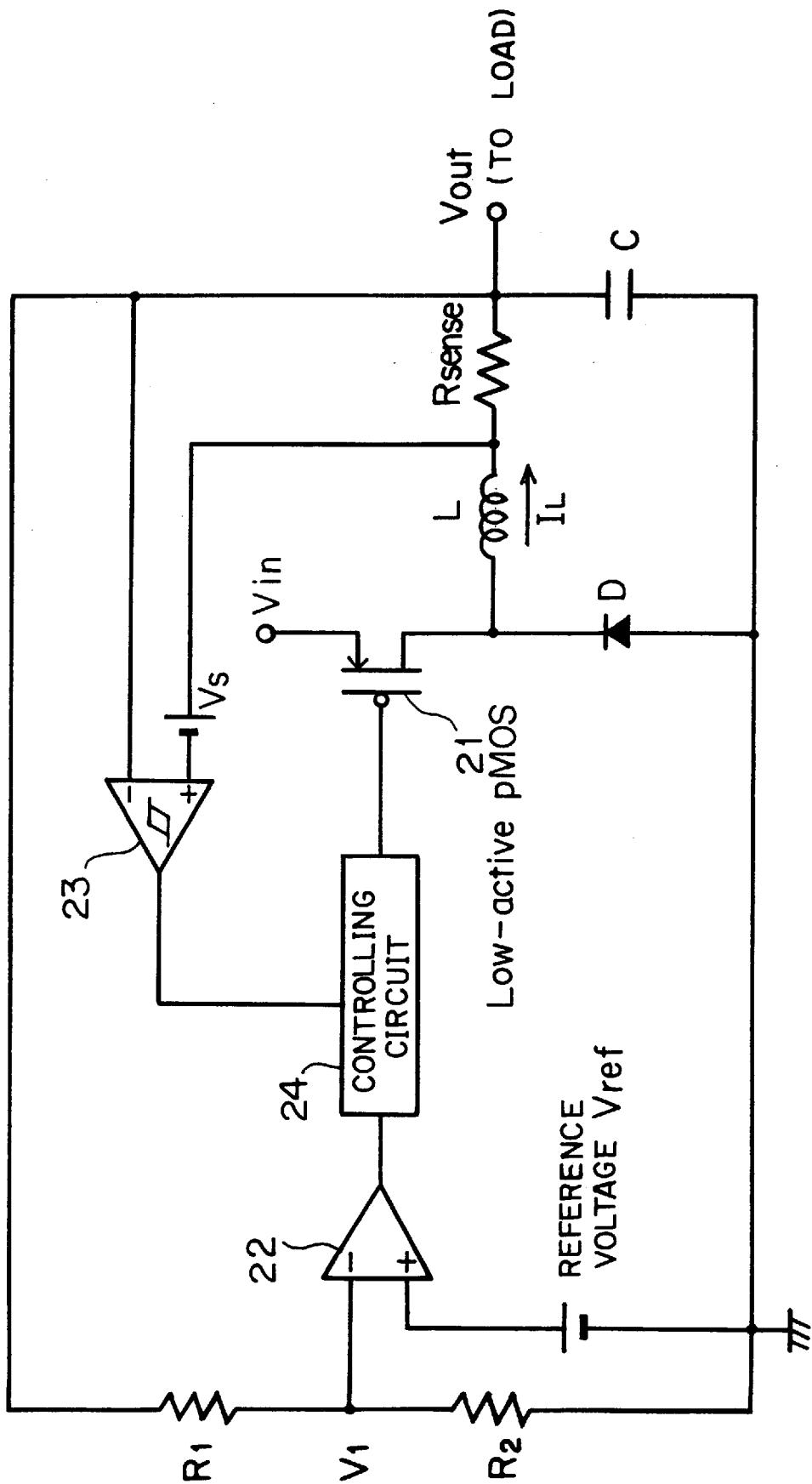
FIG. 4 is a circuit diagram showing a structure of a DC/DC converter according to an embodiment of the first aspect of the present invention.

FIG. 4 is a circuit diagram showing a structure of a DC/DC converter according to an embodiment of the first aspect of the present invention. The DC/DC converter shown in FIG. 4 converts a DC input voltage $V_{in}$ into an output voltage $V_{out}$. The DC/DC converter uses the output voltage $V_{out}$ and a coil current $I_L$ as feedback signals. A controlling circuit 24 controls a switching device 21. While the switching device 21 is in the on state, the coil current $I_L$ increases and the output voltage $V_{out}$ increases. While the switching device 21 is in the off state, the coil current $I_L$ decreases and the output voltage $V_{out}$ decreases. By the above-described control, the DC/DC converter maintains the output voltage $V_{out}$ to a predetermined constant value. In the following description, the maintained voltage is referred to as the "designated output voltage".

The switching device 21 is composed of a p-channel type power MOS transistor. When the signal level of the input signal of the gate terminal of the switching device 21 becomes "L", the switching device 21 is turned on. The input voltage $V_{in}$ is supplied to the source terminal of the switching device 21. The cathode of a diode D and a coil L are connected to the drain terminal of the switching device 21. The anode of the diode D is grounded. A coil L is connected to an output terminal through a resistor Rsense. The output terminal is grounded through a condenser C.

A reference voltage Vref is supplied to the terminal + of a comparator 22. A comparison voltage V1 of which the output voltage $V_{out}$ is divided by resistors R1 and R2 is supplied to the terminal—of the comparator 22. The comparator 22 outputs the compared result to the controlling circuit 24.

A comparator 23 is a hysteresis comparator (window comparator) that has two comparison levels. The comparator 23 monitors a voltage drop of the resistor Rsense. The current that flows in the resistor Rsense is the coil current $I_L$ that flows in the coil L. Thus, the comparator 23 monitors the coil current $I_L$. The comparison levels of the comparator 23 are designated as coil currents $I_{LP}$ and $I_{LB}$ (where $I_{LP} > I_{LB}$). When the coil current $I_L$ increases and exceeds $I_{LP}$, the signal level of the output signal of the comparator 23 becomes "H". When the coil current $I_L$ decreases to $I_{LB}$, the signal level of the output signal of the comparator 23 becomes "L". The output signal of the comparator 23 is supplied to the controlling circuit 24. In FIG. 4, the two comparison levels are designated in the comparator 23 with the designated voltage Vs. However, the two comparison voltages may be generated outside of the comparator 23.

The controlling circuit 24 controls the on/off state of the switching device 21 corresponding to the signals received from the comparators 22 and 23. In other words, the controlling circuit 24 performs the following operations (a) to (d).

Operation (a): When the signal level of the output signal of the comparator 22 changes from "L" to "H", the signal level of the output signal of the controlling circuit 24 becomes "L". Thus, the controlling circuit 24 turns on the switching device 21.

Operation (b): After the operation (a), the controlling circuit 24 enters a mode in which it does not accept the output signal of the comparator 22 (in this mode, the controlling circuit 24 ignores the output signal of the comparator 22). In this mode, even if the output signal of the comparator 22 varies, the variation does not affect the operation of the controlling circuit 24.

Operation (c): After the operation (a), when the signal level of the output signal of the comparator 23 changes from "L" to "H", the signal level of the output signal of the controlling circuit 24 becomes "H". Thus, the controlling circuit 24 turns off the switching device 21.

Operation (d): After the operation (c), when the signal level of the output signal of the comparator 23 changes from "H" to "L", the controlling circuit 24 returns to a mode in which it accepts the output signal of the comparator 22.

Next, the operation of the DC/DC converter shown in FIG. 4 will be described with reference to a timing chart shown in FIG. 5. In this case, assume that the comparison level $I_{LB}$ of the comparator 23 is 0. Thus, when the coil current $I_L$ decreases from $I_{LP}$ to 0, the signal level of the output signal of the comparator 23 changes from "H" to "L".

In the period in which the output voltage $V_{out}$ is equal to or higher than the designated output voltage (before time T1), the comparison voltage V1 is higher than the reference voltage Vref. The signal level of the output signal of the comparator 22 becomes "L". The signal level of the output signal of the controlling circuit 24 becomes "H". Thus, the switching device 21 is in the off state. At this point, the coil current $I_L$ does not flow.

When the output voltage $V_{out}$ decreases and the comparison voltage V1 decreases to the reference voltage Vref or less at time T1, the signal level of the output signal of the comparator 22 changes from "L" to "H". When the controlling circuit 24 receives the output signal of the comparator 22, the controlling circuit 24 performs the operations (a) and (b). In other words, the signal level of the output signal of the controlling circuit 24 becomes "L". Thus, the controlling circuit 24 turns on the switching device 21. Thereafter, the controlling circuit 24 ignores the output signal of the comparator 22.

When the switching device 21 is turned on, the coil current $I_L$ starts flowing. The coil current $I_L$ linearly increases corresponding to $dI_L/dt=(V_{in}-V_{out})/L$. When the coil current $I_L$ reaches the comparison level $I_{LP}$ of the comparator 23 at time T2, the signal level of the output signal of the comparator 23 changes from "L" to "H". When the controlling circuit 24 receives the output signal of the comparator 23, the controlling circuit 24 performs the operation (c). In other words, the signal level of the output signal of the controlling circuit 24 becomes "H". Thus, the controlling circuit 24 turns off the switching device 21.

When the switching device 21 is turned off, the coil current $I_L$ linearly decreases corresponding to $dI_L/dt=-V_{out}/L$. When the coil current $I_L$ reaches the comparison level $I_{LB}$ (where $I_{LB}=0$) of the comparator 23 at time T3, the signal level of the output signal of the comparator 23 changes from "H" to "L". When the controlling circuit 24 receives the output signal of the comparator 23, the controlling circuit 24 performs the operation (d). In other words, the controlling circuit 24 returns to the mode in which it accepts the output signal of the comparator 22.

The operations at time T1 to T3 compose the power supply cycle. With one power supply cycle, an electric charge (a power) represented by a triangle XYZ of a graph of a coil current in FIG. 5 is supplied to the load.

After the power supply cycle is finished, the controlling circuit 24 monitors whether or not it should further supply a power to the load. In other words, after time T3, the controlling circuit 24 references the output signal of the comparator 22 and monitors whether or not the output voltage $V_{out}$ has returned to the designated output voltage.

Figure 5:
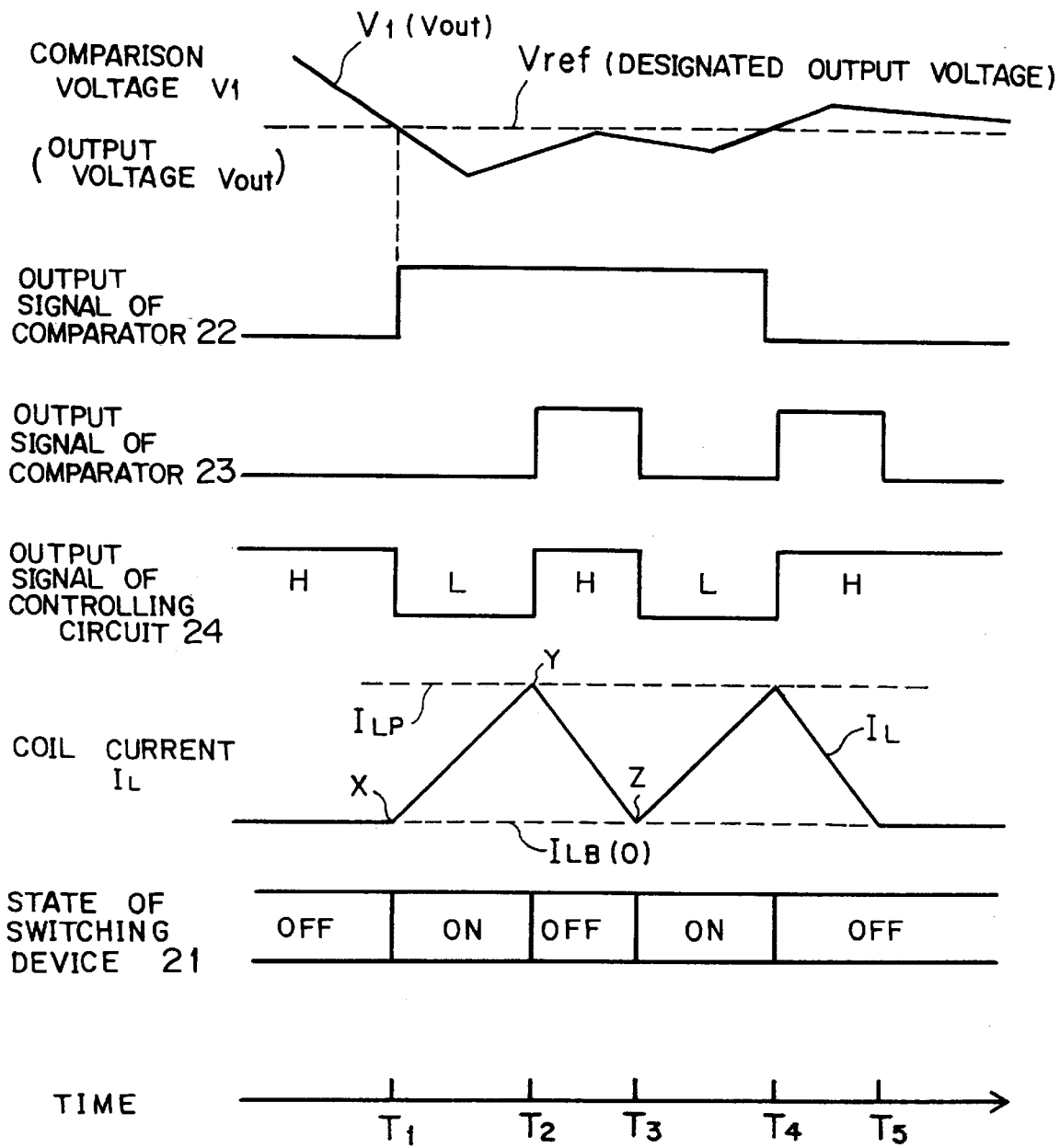
FIG. 5 is a timing chart for explaining an operation of the DC/DC converter shown in FIG. 4.

In the example shown in FIG. 5, at time T3, the output voltage $V_{out}$ has not returned to the designated output voltage. The comparison voltage V1 is lower than the reference voltage Vref. Thus, the signal level of the output signal of the comparator 22 is still "H". Consequently, the controlling circuit 24 starts the operation (a) again. In other words, the DC/DC converter immediately performs the next power supply cycle.

In time T3 to T5, when the same power supply cycle as that in time T1 to T3 is performed, the controlling circuit 24 monitors whether or not it should further supply the power to the load after time T5. At time T5, the output voltage $V_{out}$ has returned to the designated output voltage. The comparison voltage V1 is higher than the reference voltage Vref. Accordingly, the signal level of the output signal of the comparator 22 returns to "L". Thus, the controlling circuit 24 does not again perform the power supply cycle. Consequently, the coil current $I_L$ becomes 0 after time T5.

Thus, when the output voltage $V_{out}$ decreases to the predetermined output voltage or less, the DC/DC converter shown in FIG. 4 starts the power supply cycle. When the cycle is finished, the controlling circuit 24 determines whether or not it should perform the next cycle. Thus, while a particular power supply cycle is being performed, a subsequent cycle is not performed. Each cycle is fully and securely performed. The period T of the power supply cycle is calculated by the following formula.

$$T = \frac{I_{LP}}{\frac{1}{L}(V_{in} - V_{out})} + \frac{I_{LP}}{\frac{1}{L} \cdot V_{out}} \quad (1)$$
$$= \frac{L \cdot I_{LP} \cdot V_{in}}{V_{out}(V_{in} - V_{out})}$$

where the comparison level $I_{LB}$ is 0.

As represented by the formula (1), the period T of the power supply cycle depends on the comparison level $I_{LP}$ of the comparator 23, the characteristics of the coil L, the input voltage $V_{in}$, and the output voltage $V_{out}$. The output voltage $V_{out}$ fluctuates due to ripples or the like. However, the fluctuation width of the output voltage $V_{out}$ is much smaller than the designated output voltage. Thus, in the formula (1), the output voltage $V_{out}$ can be treated as a constant. Thus, by properly selecting the above-described parameters (the comparison level $I_{LP}$, the characteristics of the coil L, and the input voltage $V_{in}$), the period T of the power supply cycle can be freely designated.

When the period T is increased, the amount of power supplied to the load in one power supply cycle increases. Thus, when the period T is increased, the number of power supply cycles necessary for maintaining the output voltage $V_{out}$ to the designated output voltage decreases. When the number of power supply cycles decreases, the number of switching operations of the switching device 21 decreases. Thus, any loss in the switching device 21 decreases and thereby the converting efficiency improves. However, when the period T is increased, ripples of the output voltage $V_{out}$ become proportionally large. Consequently, the period T of the power supply cycle should be designated corresponding to the required converting efficiency and the acceptable size of ripples on the output voltage $V_{out}$.

Figure 1:
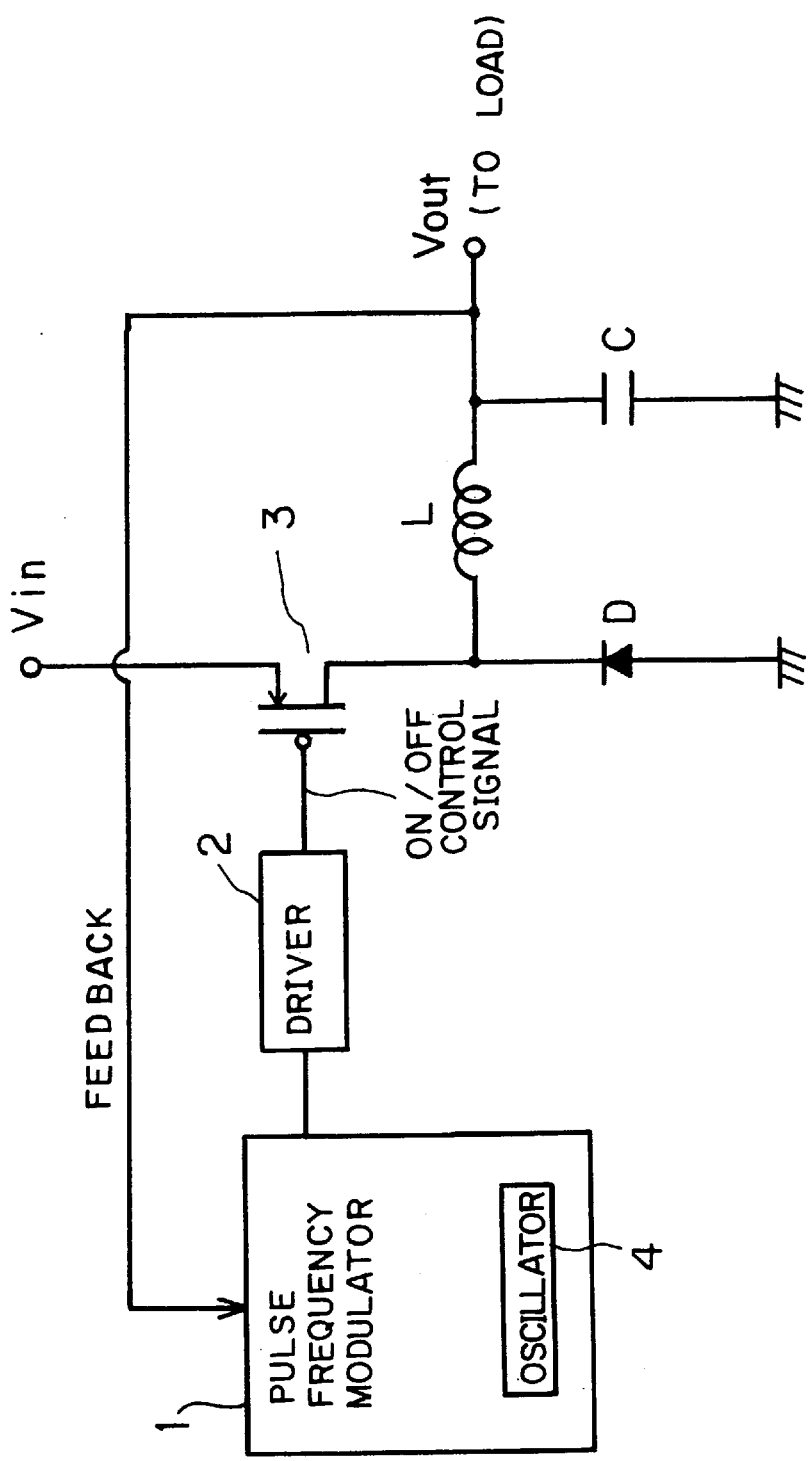
FIG. 1 is a circuit diagram showing a structure of a conventional DC/DC converter.
Figure 2A:
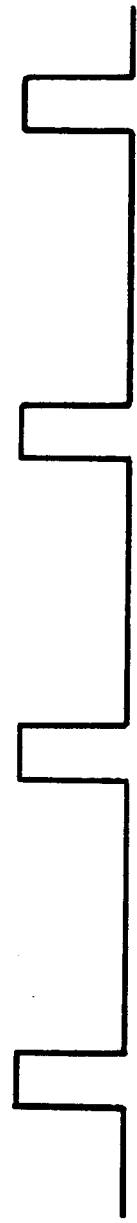
FIGS. 2A to 2C are schematic diagrams showing output signals of a pulse frequency modulator shown in FIG. 1.
Figure 2B:
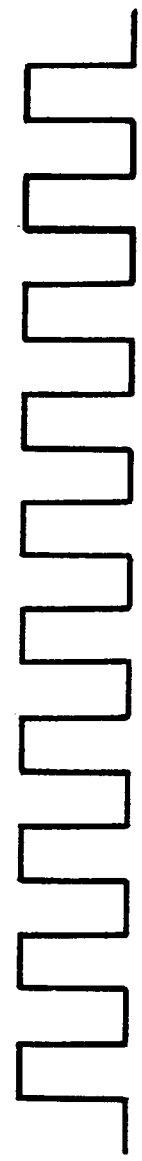
Figure 2C:

The conventional DC/DC converter has one operation mode for supplying a power to a load. In other words, regardless of the amount of the load, the power is supplied to the load in the same operation mode. For example, the DC/DC converter shown in FIG. 1 supplies the power to the load in the PFM (pulse frequency modulation) method regardless of the amount of the load. When the amount of load is large, the pulse frequency is increased. When the amount of load is small, the pulse frequency is decreased. When the amount of the load is small, some of pulses generated by the oscillator 4 are output to the switching device 3. However, when the oscillation frequency of the oscillator 4 is high, as shown in FIG. 2C, the pulse width of each pulse becomes small. The period in which the switching device is turned on with each pulse becomes very short. Thus, the power supplied to the load with each pulse is small.

On the other hand, the DC/DC converter according to the embodiment has two operation modes. When the load is small, the power is supplied to the load in the light load mode. In the light load mode, as described above, the amount of power supplied to the load in one power supply cycle can be designated. Moreover, in the light load mode, an operation condition can be designated independently from the heavy load mode. Thus, each parameter can be selected so that when the output voltage $V_{out}$ decreases to the predetermined output voltage or less, the output voltage $V_{out}$ can be restored with a small number of power supply cycles (for example, one cycle). Thus, the number of times of the switching operation of the switching device can be decreased and thereby the switching loss decreases. In other words, the converting efficiency of the DC/DC converter improves.

FIGS. 6A and 6B are schematic diagrams for comparing the method according to the embodiment and the conventional PFM method in the case that a predetermined power is supplied to a load. FIG. 6A shows the operation of the DC/DC converter according to the embodiment. FIG. 6B shows the operation of the DC/DC converter according to the PFM method. Referring to FIGS. 6A and 6B, the DC/DC converter according to the embodiment can supply the same power to the load with a smaller number of switching operations than that according to the PFM method.

When the load is small, the DC/DC converter according to the embodiment operates in the light load mode. In addition, since the number of times of the switching operation of the switching device 21 is small, the switching loss decreases. In the light load mode, since pulses are self-oscillating for the period T that depends on the above-described parameters (the comparison level $I_{LP}$, the characteristics of the coil L, and the input voltage $V_{in}$), it is not necessary to provide an oscillator. Thus, the power consumption can be reduced and the converting efficiency can be improved.

In the light load mode, the power supply cycle is not stopped in the middle thereof. In addition, the next cycle is not started in the middle of the preceding cycle. The coil current $I_L$ in each cycle increases from the comparison level $I_{LB}$ (0 in the embodiment) to the comparison level $I_{LP}$ and returns to the comparison level $I_{LB}$. Since the slope of the increase of the coil current $I_L$ and the slope of the decrease thereof are constant, the waveform of the coil current $I_L$ is always constant as shown in FIG. 5. Thus, the ripples of the output voltage $V_{out}$ become constant. Consequently, the noise bandwidth becomes narrow. In a PFM method, described as a conventional control technique, since a cycle of an increase and a decrease of a coil current is not constant, the ripples are not constant. The method of the embodiment solves the problem, and the noise can be easily removed.

In the light load mode, the maximum value of the current (the maximum supply current) supplied to the load becomes $I_{LP}/2$. When $I_{LB}$ is designated to a value other than 0 as the comparison level of the comparator 23, the maximum supply current becomes $(I_{LP}+I_{LB})/2$. Since the maximum supply current directly depends on the comparison level $I_{LP}$ (and $I_{LB}$) of the comparator 23, even if an overcurrent takes place due to a defect of the load, a large current that exceeds $I_{LP}/2$ does not flow in the switching device 21 and the coil L. Thus, the switching device 21 and the coil L can be prevented from being damaged by such a large current. In other words, since the DC/DC converter itself has an overcurrent protecting function, a drooping type overcurrent protecting function can be accomplished without the need to provide a special circuit.

Figure 7:
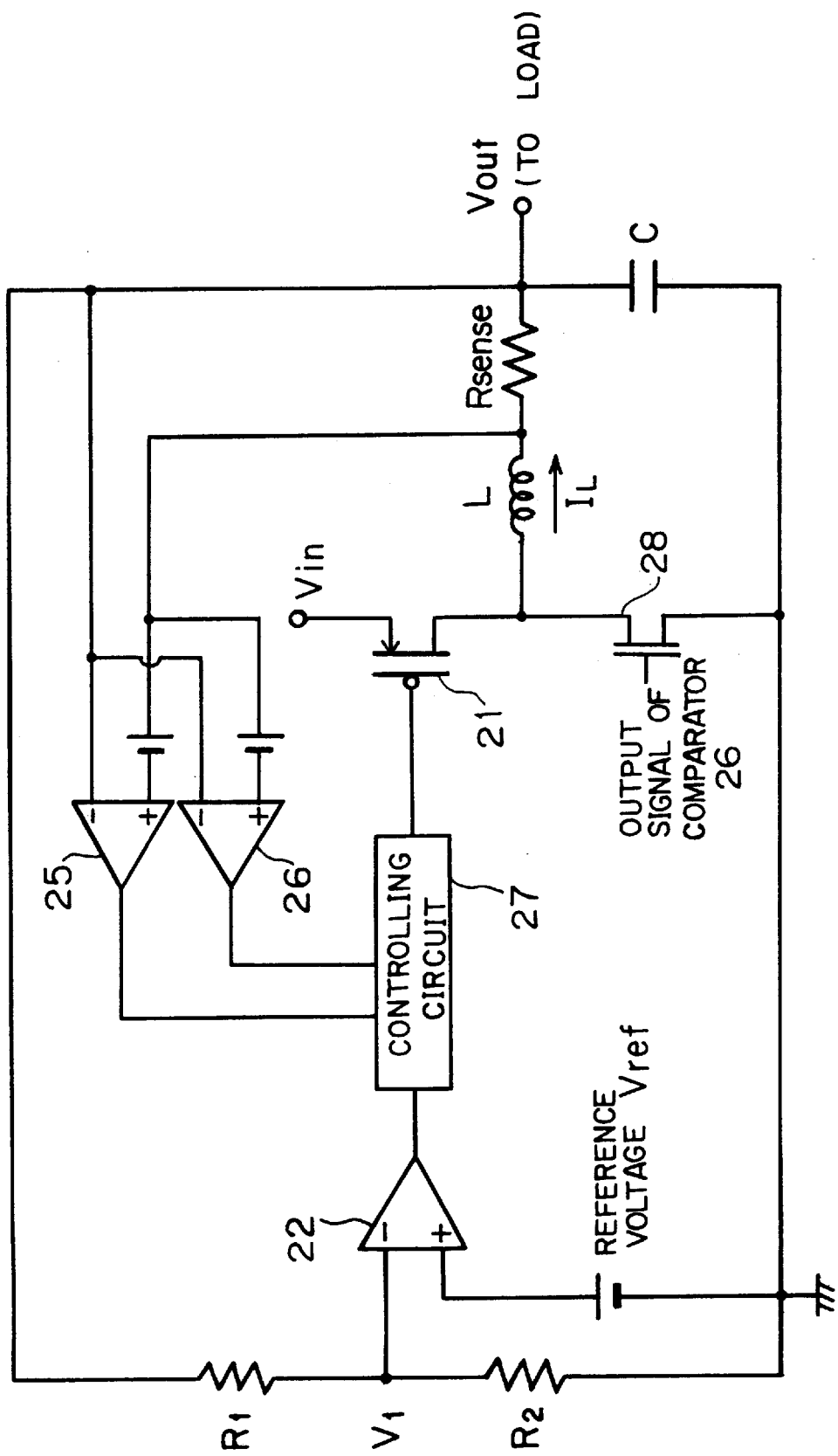
FIG. 7 is a circuit diagram showing another structure of the DC/DC converter according to the first aspect of the present invention.

FIG. 7 is a circuit diagram showing another structure of the DC/DC converter according to the first aspect of the present invention. The DC/DC converter shown in FIG. 7 has two comparators 25 and 26 instead of the comparator 23 shown in FIG. 4.

Each of the comparators 25 and 26 is designated comparison levels $I_{LP}$ and $I_{LB}$. When the coil current $I_L$ increases to the comparison level $I_{LP}$ or more, the signal level of the output signal of the comparator 25 becomes "H". When the coil current $I_L$ decreases to the comparison level $I_{LB}$ or less, the signal level of the output signal of the comparator 26 becomes "L".

A controlling circuit 27 controls the on/off state of a switching device 21 corresponding to signals received from comparators 22, 25, and 26. In reality, the controlling circuit 27 performs the following operations (e) to (g).

Operation (e): The above-described operations (a) and (b) are performed.

Operation (f): After the operation (e) is performed, when the signal level of the output signal of the comparator 25 changes from "L" to "H", the signal level of the output signal of the controlling circuit 27 becomes "H". Thus, the controlling circuit 27 turns off the switching device 21.

Operation (g): After the operation (f) is performed, when the signal level of the output signal of the comparator 26 changes from "H" to "L", the controlling circuit 27 returns to a mode in which it accepts the output signal of the comparator 22.

In the structure shown in FIG. 7, it is not necessary to provide a hysteresis comparator (window comparator). When a synchronous rectifying type DC/DC converter is accomplished with a switching device 28 composed of an MOS transistor or the like instead of a diode D, the on/off state of the switching device 28 is controlled corresponding to the output signal of the comparator 26.

As described above, according to the first aspect of the present invention, in the light load mode, the power required for the load can be supplied with a small number of switching operations of the switching device, the switching loss decreases. Thus, the converting efficiency of the DC/DC converter improves. In addition, since an oscillator can be omitted, the power consumption can be further reduced.

In the first aspect of the present invention, since the waveform of the current is constant when a power is supplied to a load, ripples of the output voltage become constant. Thus, the bandwidth of noise becomes narrow. Consequently, the noise can be easily removed. In addition, since the maximum value of the current supplied to the load is automatically designated, even if an overcurrent flows in the load, each element of the DC/DC converter can be protected.

Next, the second aspect of the present invention will be described. The second aspect of the present invention has a structure for which the operation mode of the DC/DC converter is switched from the light load mode to the heavy load mode.

The current that a load requires varies corresponding to the operation state of the load. In the case of a portable terminal, when keys are operated, the current consumption is relatively small. However, when a disk is accessed, the current consumption is large. When the current that the load requires exceeds the current that the DC/DC converter provides, the output voltage of the DC/DC converter decreases.

As described in the first aspect of the present invention, when the output voltage $V_{out}$ decreases to the predetermined output voltage or less while the DC/DC converter is operating in the light load mode, the power supply cycle shown in FIG. 5 is performed. When a particular power supply cycle is finished, when the output voltage $V_{out}$ is still lower than the predetermined output voltage, the next cycle is immediately performed. In other words, in the light load mode, until the output voltage $V_{out}$ reaches the predetermined output voltage, the power supply cycles are continuously performed.

Thus, when the power supply cycles are continuously performed, it is determined that "the current required by the load cannot be satisfactorily supplied in the light load mode". Thus, the operation mode of the DC/DC converter is switched from the light load mode to the heavy load mode.

Figure 8:
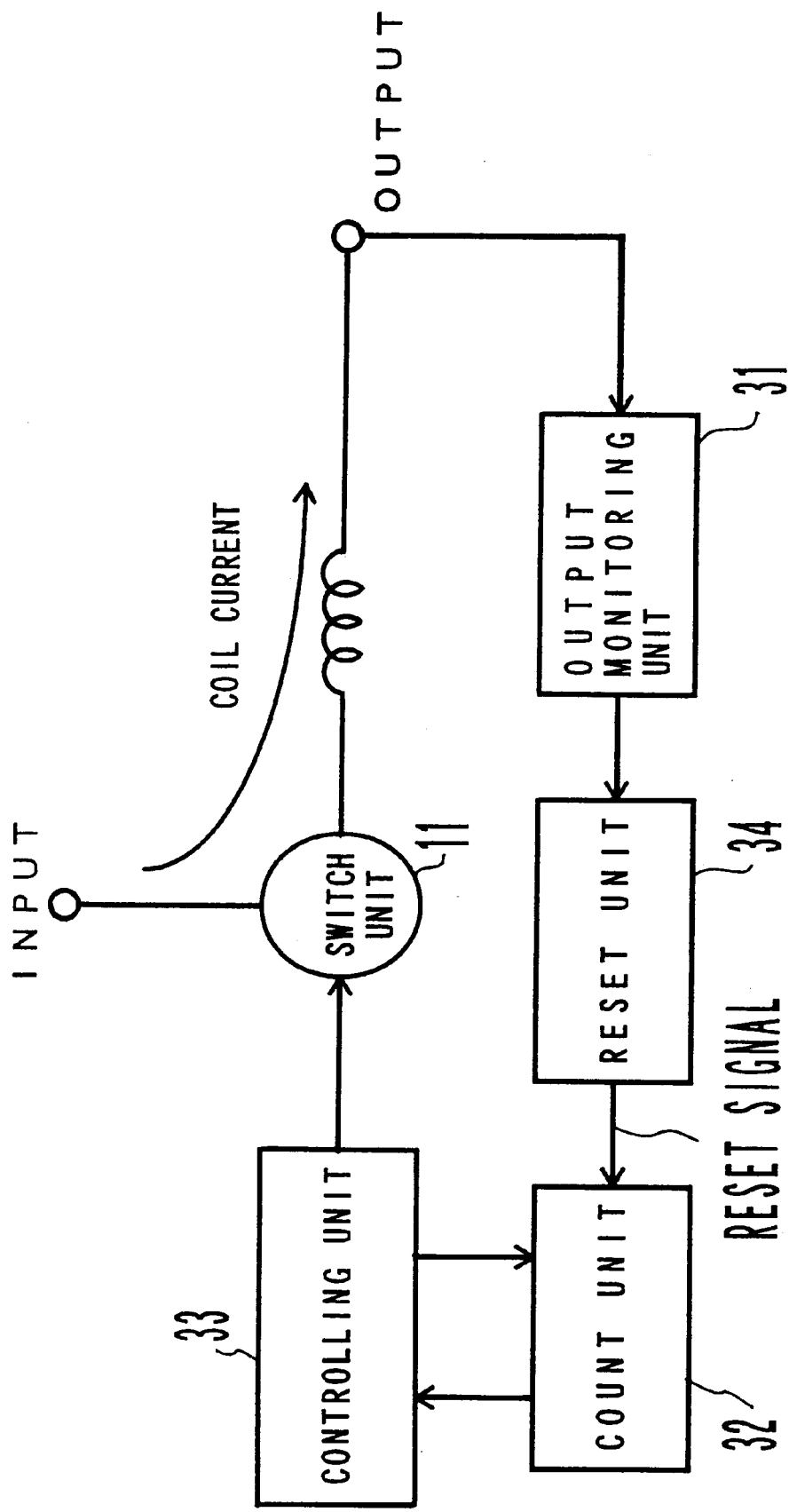
FIG. 8 is a block diagram showing a structure of a DC/DC converter according to a second aspect of the present invention.

FIG. 8 is a block diagram showing a structure of a DC/DC converter according to the second aspect of the present invention. As with the first aspect of the present invention, the DC/DC converter according to the second aspect controls a switch unit 11 so as to vary the coil current and control the output.

An output monitoring unit 31 is composed of, for example, a comparator. The output monitoring unit 31 compares an output voltage with a predetermined voltage. A count unit 32 counts the number of current supply cycles in the light load mode. A controlling unit 33 switches the operation mode from the light load mode to the heavy load mode so as to control the switch unit 11 when the count value of the count unit 32 exceeds a predetermined value. A reset unit 34 references the compared result of the output monitoring unit 31 and resets the count value of the count unit 32 when the output voltage is higher than the predetermined voltage.

While the DC/DC converter is operating in the light load mode, when the output voltage decreases to the predetermined value or less, the output monitoring unit detects this situation and starts a power supply cycle for increasing the output voltage. Whenever the power supply cycle is performed, the count unit 32 increments the count value.

When the power supply cycle is finished, the reset unit 34 references the compared result of the output monitoring unit 31 and starts the next cycle when the output voltage is not restored to the above-described predetermined value. At this point, the count unit 32 increments the count value. When the count value reaches the predetermined value, the controlling unit 33 switches the operation mode of the DC/DC converter from the light load mode to the heavy load mode and controls the switch unit 11.

When the power supply cycle is performed, the output voltage increases. When the output voltage exceeds the predetermined value, the reset unit 34 resets the count unit 32. In other words, before the count value of the count unit 32 reaches the predetermined value, when the output voltage is restored, the controlling unit 33 does not switch the operation mode of the DC/DC converter. Thus, only when the power supply cycles are continuously performed, the controlling unit 33 determines that more power should be supplied to the load and switches the operation mode from the light load mode to the heavy load mode. Thus, even if the output voltage of the DC/DC converter instantaneously decreases or noise occurs, the operation mode is not incorrectly switched.

Figure 9:
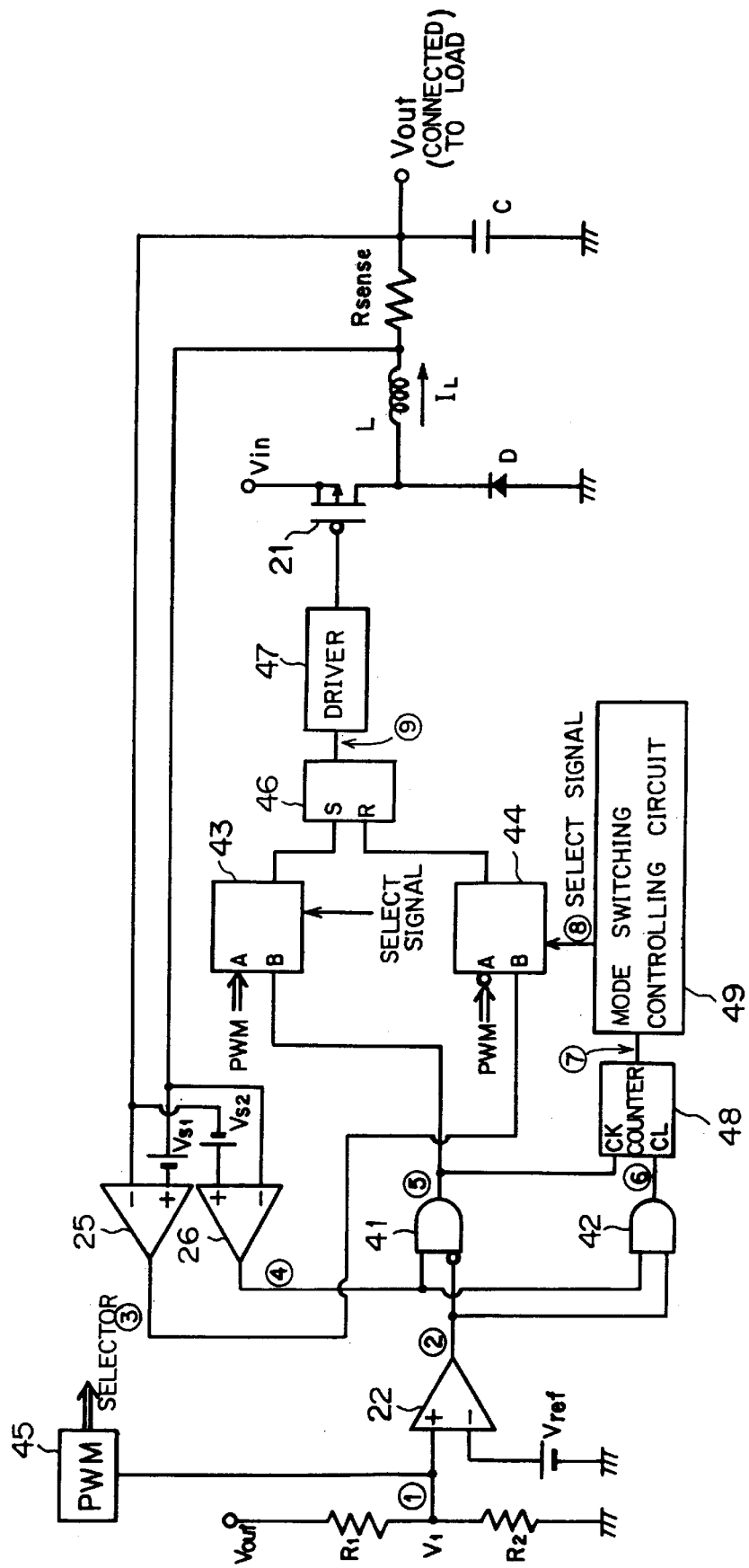
FIG. 9 is a circuit diagram showing a DC/DC converter according to an embodiment of the second aspect of the present invention.

FIG. 9 is a circuit diagram showing a structure of a DC/DC converter according to an embodiment of the second aspect of the present invention. In FIG. 9, similar portions to those in FIGS. 4 and 7 are denoted by similar reference numerals.

The DC/DC converter shown in FIG. 9 converts an input voltage $V_{in}$ into an output voltage $V_{out}$. The DC/DC converter has two operation modes—the heavy load mode that operates when the current consumption of a load is large, and the light load mode that operates when the current consumption of a load is small. When the load current varies, these operation modes are automatically switched by an internal control. In the following description, the operation for switching the operation mode of the DC/DC converter from the light load mode to the heavy load mode will be described.

As described with reference to FIG. 4, a switching device 21 is composed of a power MOS transistor. The on/off state of the switching device 21 is controlled corresponding to the output signal of a driver 47. Likewise, a comparator 22 compares a comparison voltage V1 with a reference voltage Vref and determines whether or not the output voltage $V_{out}$ exceeds a designated output voltage. The comparator 22 outputs the compared result to AND circuits 41 and 42.

As described with reference to FIG. 7, comparators 25 and 26 detect a voltage difference between both terminals of a resistor Rsense so as to monitor a coil current $I_L$. The comparison level of the comparator 25 is designated as $I_{LP}$ for a coil current. The comparator 25 compares the coil current $I_L$ with the comparison level $I_{LP}$. When the coil current $I_L$ exceeds the comparison level $I_{LP}$, the signal level of the output signal of the comparator 25 becomes "H". The output signal of the comparator 25 is sent to a terminal B of a selector 44. The comparison level of the comparator 26 is designated as $I_{LB}$ for a coil current (where $I_{LP} > I_{LB}$). The comparator 26 compares the coil current $I_L$ with the comparison level $I_{LB}$. When the coil current $I_L$ is lower than the comparison level $I_{LB}$, the signal level of the output signal of the comparator 26 becomes "H". The comparison level $I_{LB}$ is designated as 0 for a coil current (actually, as will be described later, the comparison level $I_{LB}$ is slightly higher than 0). The output signal of the comparator 26 is sent to the AND circuits 41 and 42. The comparison levels $I_{LP}$ and $I_{LB}$ are designated with offset voltages Vs1 and Vs2.

When the operation mode of the DC/DC converter is switched corresponding to the load current, the load current may be directly detected. However, in this case, it is necessary to dispose a resistor on the output side of a condenser C. Thus, the total efficiency of the DC/DC converter is adversely deteriorated. To prevent this problem, according to this embodiment, the load current is detected with a resistor Rsense disposed on the input side (primary side) of the condenser C. The resistor Rsense is disposed so as to protect the circuit from an overcurrent and to maintain the output voltage constant. Thus, it is not necessary to newly provide a resistor for detecting a switching point for the operation mode.

The AND circuit 41 receives the output signal of the comparator 26 and an inverted signal of the output signal of the comparator 22, and sends the resultant signal to a terminal B of a selector 43 and a clock terminal CK of a counter 48. The signal level of the output signal of the AND circuit 41 becomes "H" when the coil current $I_L$ is 0 and the output voltage $V_{out}$ is lower than the designated output voltage. The AND circuit 42 receives the output signal of the comparator 26 and the output signal of the comparator 22, and sends the resultant signal to a clear terminal CL of the counter 48. The signal level of the output signal of the AND circuit 42 becomes "H" when the coil current $I_L$ is 0 and the output voltage $V_{out}$ is higher than the designated output voltage.

Each of the selectors 43 and 44 selects a signal that is input to the terminal A when the signal level of the select signal is "H", and selects a signal that is input to the terminal B when the signal level of the select signal is "L". The output signal of the selector 43 is supplied to a terminal S (set terminal) of a flip-flop 46. The output signal of the selector 44 is supplied to a terminal R (reset terminal) of the flip-flop 46.

A PWM controlling circuit (heavy load controlling circuit) 45 outputs a pulse signal with a duty cycle which is controlled such that the output voltage $V_{out}$ remains constant. For instance, when a load current becomes high and the output voltage $V_{out}$ decreases, the PWM controlling circuit 45 increases a duty cycle of the pulse signal to increase an average coil current $I_L$. Then the output $V_{out}$ returns to a predetermined value, the duty cycle is back to the value of $V_{out}/V_{in}$. An inverted signal of the output signal of the PWM controlling circuit 45 is sent to a terminal A of the selector 44.

When the flip-flop 46 is in the set state, it outputs an on-signal. When the flip-flop 46 is in the reset state, it outputs an off-signal. When the driver 47 receives the on-signal, it causes the switching device 21 to be turned on. When the driver 47 receives the off-signal, it causes the switching device 21 to be turned off.

The output signal of the AND circuit 41 is supplied to the clock terminal CK of the counter 48. The output signal of the AND circuit 42 is supplied to the clear terminal CK of the counter 48. While the signal level of the input signal of the clear terminal CL is "L", whenever a leading edge is detected at the clock terminal CK, the count value of the counter 48 is incremented. When the signal level of the input signal of the clear terminal CK becomes "H", the counter value is cleared to 0. When the count value becomes "n"

(where n is an integer), the counter 48 sends a pulse to a mode switching controlling circuit 49. In this embodiment, a value of n=4 is designated. When the operation mode of the DC/DC converter is switched from the heavy load mode to the light load mode, the counter 48 is reset.

The mode switching controlling circuit 49 causes the operation mode of the DC/DC converter to be switched. The mode switching controlling circuit 49 sends a select signal to the selectors 43 and 44. When the mode switching controlling circuit 49 receives a pulse (leading edge) from the counter 48, the mode switching controlling circuit 49 causes the signal level of the select signal to become "H" and keeps the signal at this level. When the signal level of the select signal is "L", the DC/DC converter operates in the light load mode. When the signal level of the select signal is "H", the DC/DC converter operates in the heavy load mode. When the signal level of the select signal becomes "H", each of the selectors 43 and 44 selects the output signal of the PWM controlling circuit 45. The switching device 21 is driven corresponding to the selected signal.

The operation for switching the operation mode of the DC/DC converter from the heavy load mode to the light load mode will be described later as the third aspect of the present invention.

Next, the operation of the DC/DC converter according to the second aspect of the present invention will be described. In the light load mode, each of the selectors 43 and 44 selects a signal that is input to the terminal B and outputs the selected signal. In this state, when the output voltage $V_{out}$ is higher than a predetermined voltage (designated output voltage) for driving the load, the signal level of the output signal of the comparator 22 becomes "H". Thus, since the switching device 21 is turned off, the DC/DC converter does not supply a current to the load.

On the other hand, when the output voltage $V_{out}$ decreases to the designated output voltage or less, the switching device 21 is controlled with the value of the coil current $I_L$ as a feedback signal so as to supply a current to the load. Even if the current is supplied to the load in the light load mode, when the output voltage $V_{out}$ cannot be restored, the operation mode of the DC/DC converter is switched from the light load mode to the heavy load mode. Thus, since a large current is supplied to the load, the output voltage $V_{out}$ increases.

Figure 10:
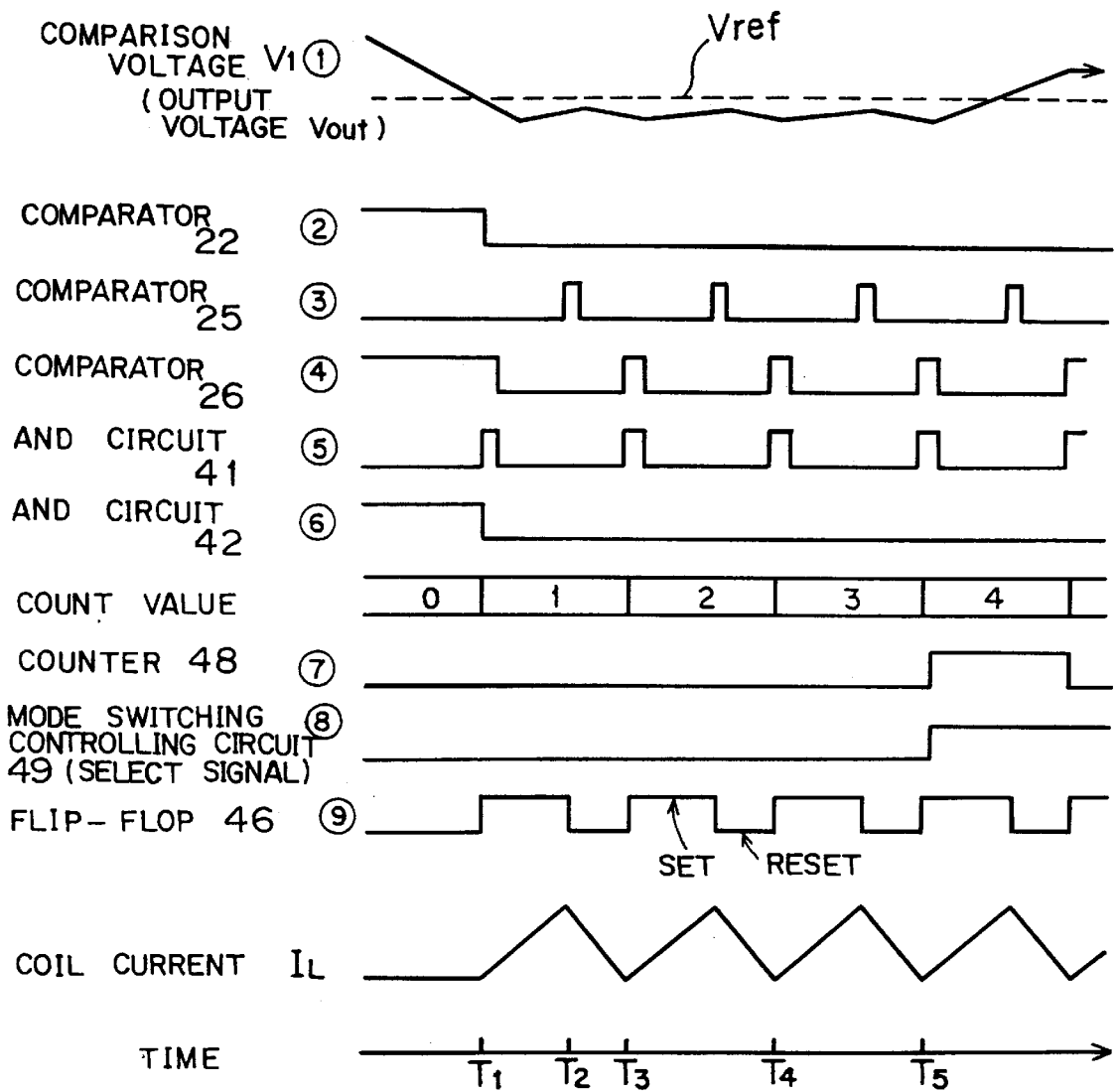
FIG. 10 is a timing chart for explaining an operation of the DC/DC converter shown in FIG. 9.

Next, the operation of the DC/DC converter according to the second aspect of the present invention will be described with reference to a timing chart. FIG. 10 shows a timing chart for explaining the operation for switching the operation mode of the DC/DC converter from the light load mode to the heavy load mode.

Before time T1, the output voltage $V_{out}$ is higher than the designated output voltage. The comparison voltage V1 is higher than the reference voltage Vref. Thus, the signal level of the output signal of the comparator 22 is "H". In this state, it is not necessary for the DC/DC converter to supply a current to the load. Thus, the coil current $I_L$ is 0. Next, the operations of the comparators 25 and 26 that detect the coil current $I_L$ will be described with reference to FIG. 11.

Since the negative offset voltage $V_{s1}$ is supplied to the terminal + of the comparator 25, the voltage at the terminal + is negative. Thus, when the coil current $I_L$ is 0, the signal level of the output signal of the comparator 25 is "L". When the coil current $I_L$ increases to the comparison level $I_{LP}$, the voltage difference between both the terminals of the resistor Rsense exceeds the offset voltage $V_{s1}$, the signal level of the output signal of the comparator 25 changes from "L" to "H". Since the signal level is changed, the switching device 21 is turned off. Thus, the coil current $I_L$ decreases. When the coil current $I_L$ decreases to the comparison level $I_{LP}$ or less, the signal level of the output signal of the comparator 25 changes from "H" to "L".

Since the positive offset voltage $V_{s2}$ is supplied to the terminal + of the comparator 26, the signal level of the terminal + is positive. Thus, when the coil current $I_L$ is 0, the signal level of the output signal of the comparator 26 becomes "H". When the coil current $I_L$ increases to the comparison level $I_{LB}$, the voltage difference between both the terminals of the resistor Rsense exceeds the offset voltage $V_{s2}$. Thus, the signal level of the output signal of the comparator 26 changes from "H" to "L". In addition, since the switching device 21 is turned off, the coil current $I_L$ decreases. When the coil current $I_L$ decreases to the comparison level $I_{LB}$ or less, the signal level of the output signal of the comparator 26 changes from "L" to "H". In this embodiment, the comparison level $I_{LB}$ is designated to a value that is slightly larger than 0. Thus, it can be considered that only when the coil current $I_L$ is 0, the signal level of the output signal of the comparator 26 becomes "H".

As described above, when the coil current $I_L$ is 0, the signal level of the output signal of the comparator 26 is "H". Thus, before time T1, the signal level of the output signal of the AND circuit 42 becomes "H". Since the counter 48 is in the reset state, the count value is "0".

While the DC/DC converter is operating in the light load mode, at time T1, when the output voltage $V_{out}$ decreases to the predetermined output voltage or less, the signal level of the output signal of the comparator 22 becomes "L". Thus, the signal level of the output signal of the AND circuit 42 becomes "L". Consequently, the counter 48 is restored from the reset state. In other words, when the output voltage $V_{out}$ decreases to the designated output voltage or less, the counter 48 enters a mode in which the counter can count pulses.

When the signal level of the output signal of the comparator 22 becomes "L", the signal level of the output signal of the AND circuit 41 temporarily becomes "H". A leading edge of the output signal of the AND circuit 41 causes the count value of the counter 48 to increment from "0" to "1". In the light load mode, each of the selectors 43 and 44 selects a signal that is input to the terminal B. Thus, when the signal level of the output signal of the AND circuit 41 becomes "H", the state of the flip-flop 46 becomes "set". Consequently, the switching device 21 is turned on. When the switching device 21 is turned on and the coil current $I_L$ increases (ramps up), since the signal level of the output signal of the comparator 26 becomes "L", the signal level of the output signal of the AND circuit 41 returns to "L".

Figure 11:
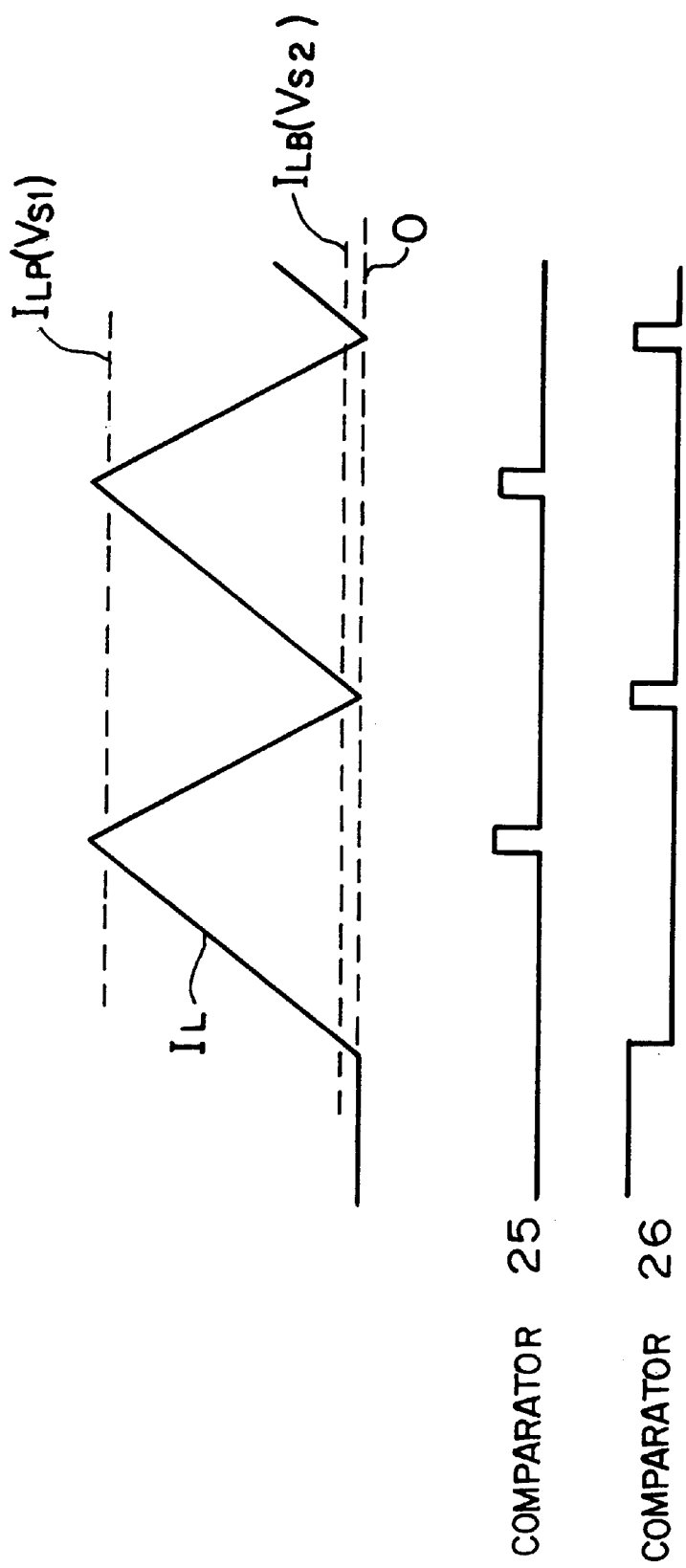
FIG. 11 is a timing chart for explaining an operation of a comparator for detecting a coil current.

At time T2, when the coil current $I_L$ increases to the comparison level $I_{LP}$, as described with reference to FIG. 11, the signal level of the output signal of the comparator 25 temporarily becomes "H". When the signal level of the output signal of the comparator 25 becomes "H", the state of the flip-flop 46 becomes "reset". Thus, the switching device 21 is turned off. When the switching device 21 is turned off and the coil current $I_L$ decreases (ramps down), the signal level of the output signal of the comparator 25 becomes "L". At time T3, when the coil current $I_L$ becomes 0 (the coil current $I_L$ decreases to the comparison level $I_{LB}$ or less), the signal level of the output signal of the comparator 26 becomes "H".

At time T1, the coil current $I_L$ starts increasing from 0. At time T2, the coil current $I_L$ reaches the comparison level $I_{LP}$. At time T3, the coil current returns to 0. The coil current $I_L$ that flows in time T1 to T3 is supplied to the load. The operation of the DC/DC converter in time T1 to T3 is the same as the operation of the power supply cycle described in the first aspect of the present invention.

At time T3, when one power supply cycle is finished, it is determined whether or not the output voltage $V_{out}$ is restored to the designated output voltage corresponding to the output signal of the comparator 22. In the example shown in FIG. 10, since the output voltage $V_{out}$ is not restored to the designated output voltage, the next power supply cycle for supplying a current to the load is started.

At time T3, since the output voltage $V_{out}$ is lower than the designated output voltage, the signal level of the output signal of the comparator 22 is still "L". At time T3, when the coil current $I_L$ returns to 0, the signal level of the output signal of the comparator 26 becomes "H". The signal level of the output signal of the AND circuit 41 becomes "H". A leading edge of the output signal of the AND circuit 41 causes the count value of the counter 48 to increment from "1" to "2".

When the second power supply cycle is started, the count value of the counter 48 becomes "2". The count value of the counter 48 represents the number of the power supply cycles.

The operation in time T3 to T4 is the same as the operation of the power supply cycle in time T1 to T3. When the cycle is finished (at time T4), it is determined whether or not the next cycle should be performed corresponding to the output signal of the comparator 22. In the example shown in FIG. 10, the output voltage $V_{out}$ is not restored to the predetermined output voltage. The signal level of the output signal of the comparator 22 is "L". Thus, in time T4 to T5, the next cycle is performed. When the cycle is performed in time T4 to T5, the count value of the counter 48 increments from "2" to "3".

When the output voltage $V_{out}$ decreases in the light load mode, while the output voltage $V_{out}$ is equal to or lower than the predetermined output voltage, the power supply cycles are continuously performed. Whenever the cycle is performed, the count value of the counter 48 is incremented.

In time T1 to T5, three power supply cycles are performed. However, in the example shown in FIG. 10, at time T5, the output voltage $V_{out}$ is not restored to the predetermined output voltage. Thus, the next power supply cycle is attempted to be performed. At this point, the count value of the counter 48 becomes "4". When the count value of the counter 48 becomes "4", the signal level of the output signal of the counter 48 changes from "L" to "H".

When the mode switching controlling circuit 49 detects a leading edge of the output signal of the counter 48, the mode switching controlling circuit 49 causes the signal level of the select signal to be changed from "L" to "H". When the signal level of the select signal becomes "H", each of the selectors 43 and 44 selects a signal that is input to the terminal A (namely, the signal generated by the PWM controlling circuit (heavy load controlling circuit) 45). Thus, the switching device 21 is turned on/off corresponding to a signal generated by the PWM controlling circuit 45. Consequently, the operation mode of the DC/DC converter is switched to the heavy load mode.

As described above, in the light load mode, when the output voltage $V_{out}$ decreases due to an increase of the load current and a predetermined number of the power supply cycles are successively counted (for example, four cycles) for restoring the desired voltage, the operation mode of the DC/DC converter is automatically switched from the light load mode to the heavy load mode.

Figure 12:
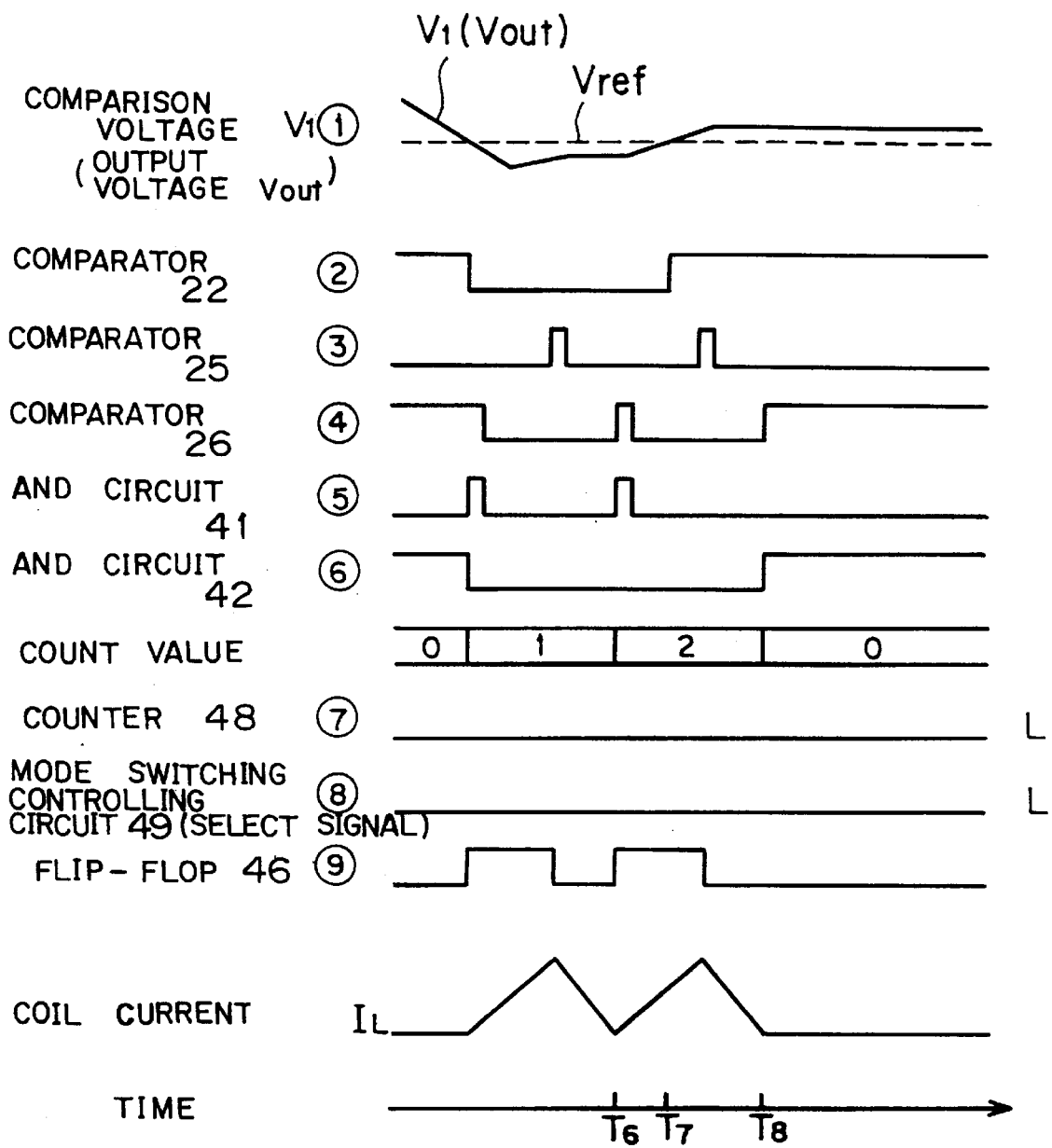
FIG. 12 is a timing chart for explaining an operation of the DC/DC converter shown in FIG. 9 in the case that a count value is reset.

FIG. 12 is a timing chart for explaining the operation in which the count value is reset in the light load mode.

In the example shown in FIG. 12, at time T6, the second power supply cycle is started. Thus, the count value of the counter 48 increments from "1" to "2". In the second cycle, at time T7, when the output voltage $V_{out}$ exceeds the designated output voltage, the signal level of the output signal of the comparator 22 becomes "H".

After the second power supply cycle is finished, at time T8, it is determined whether or not a current should be further supplied to the load corresponding to the output signal of the comparator 22. In the example shown in FIG. 12, at time T8, the output voltage $V_{out}$ is higher than the designated output voltage. The signal level of the output signal of the comparator 22 is "H". Thus, the signal level of the output signal of the AND circuit 41 is "L". The state of the flip-flop is still "reset". Consequently, the switching device 21 is not turned on. The next power supply cycle is not started.

At time T8, since the coil current $I_L$ is 0, the signal level of the output signal of the comparator 26 becomes "H". The signal level of the output signal of the AND circuit 42 becomes "H". When the signal level of the AND circuit 42 becomes "H", the counter 48 is reset. Thus, the count value returns to "0". Thereafter, the DC/DC converter is operated in the light load mode.

Thus, in the light load mode, when the output voltage $V_{out}$ decreases, the power supply cycle is performed. The counter 48 counts the number of the cycles. However, in a predetermined time period (equivalent to four power supply cycles in the embodiment), when the output voltage $V_{out}$ is restored to the predetermined output voltage, the counter 48 is reset and the count value returns to "0". Thus, even if the output voltage $V_{out}$ instantaneously decreases and the power supply cycle starts, the counter 48 is reset in a short time. Consequently, when the output voltage $V_{out}$ is restored in a short time, the operation mode of the DC/DC converter is not switched from the light load mode to the heavy load mode. In other words, the operation mode of the DC/DC converter according to the embodiment is not incorrectly switched due to noise or another factor.

While the DC/DC converter is being operated in the heavy load mode, the counter 48 is in the reset state. The counter value is still "0".

Figure 13:
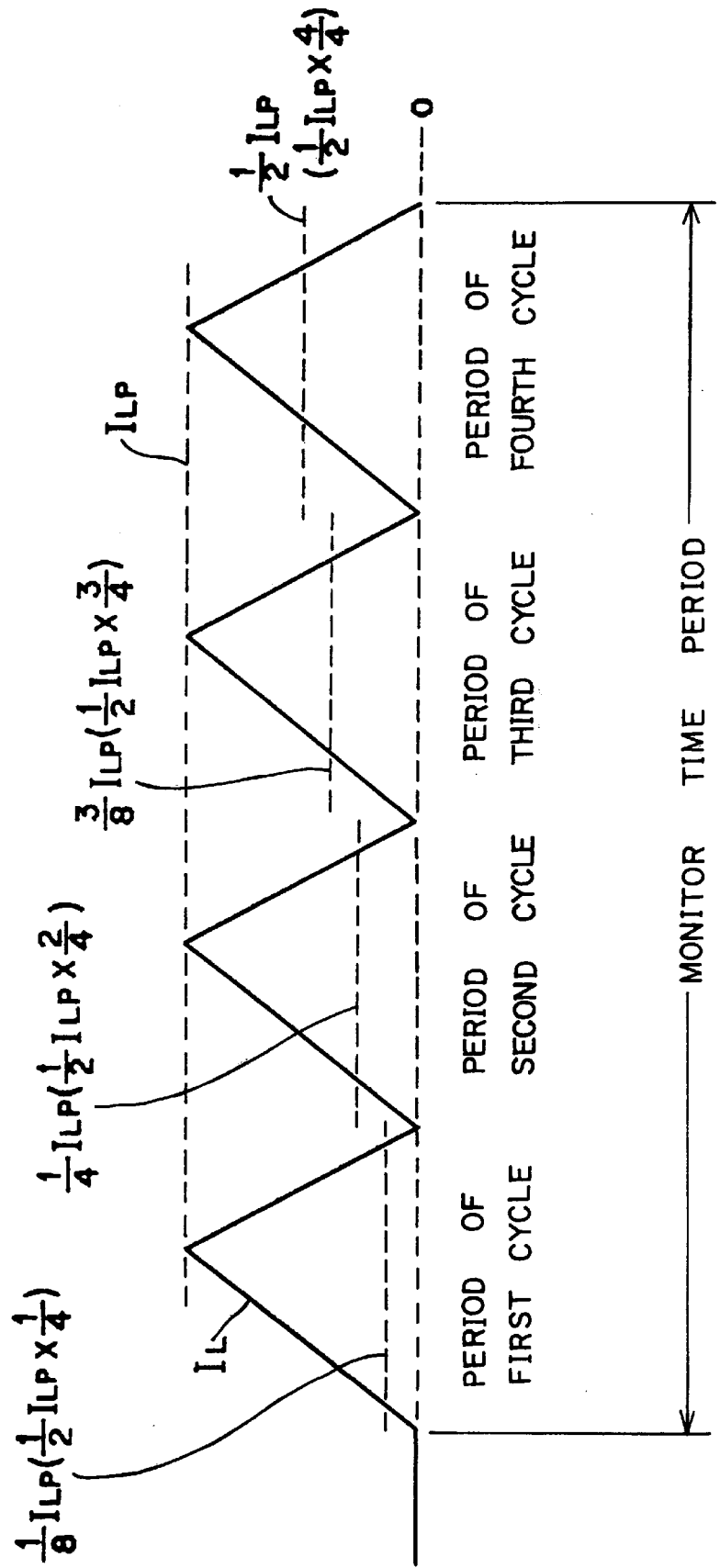
FIG. 13 is a schematic diagram showing the relation between a power supply cycle and an average value of a coil current.

FIG. 13 is a schematic diagram showing the relation between the power supply cycle and the average value of the coil current $I_L$ in the light load mode. In the light load mode, the peak value of the coil current $I_L$ is $I_{LP}$ (the comparison level of the comparator 25). The base value is 0 (the comparison level $I_{LB}$ of the comparator 26).

In the DC/DC converter according to the embodiment, when four power supply cycles are successively counted are detected, the operation mode is switched from the light load mode to the heavy load mode. The time period for which the four power supply cycles are successively performed is referred to as the "monitor time period". The average value of the coil current $I_L$ in the monitor time period will now be explained. When one power supply cycle is performed in a predetermined monitor time period, the average value of the coil current $I_L$ in the period becomes $I_{LP}/8$. When four power supply cycles are performed in the predetermined monitor time period, the average value of the coil current $I_L$ in the period is $I_{LP}/2$. As described above, the operation mode is switched from the light load mode to the heavy load mode when four power supply cycles are successively performed. Thus, the operation mode is switched when the average value of the coil current becomes, $I_{LP}/2$.

The current value $I_{LP}/2$ is the maximum current that is supplied to the load in the light load mode. The average value of the coil current $I_L$ can be treated as a load current. Thus, when the load current reaches the maximum supply current in the light load mode, the operation mode of the DC/DC converter according to the embodiment is switched to the heavy load mode.

The coil current $I_L$ depends on the characteristics of the coil L, the input voltage $V_{in}$, the output voltage $V_{out}$, the comparison level $I_{LP}$ Of the comparator 25. Thus, when $I_{LP}$ is designated, the switching point at which the operation mode is switched from the light load mode to the heavy load mode can be designated.

In the above-described embodiment, when the count value of the counter 48 becomes "4", the operation mode is switched. When the count value is increased, since the period for which the average value of the coil current $I_L$ is obtained becomes long, the accuracy is improved.

As described above, in the DC/DC converter according to the embodiment, since the circuit that obtains the load current is composed of a comparator, a gate circuit, a counter circuit, and so forth that do not consume much power, the total current consumption of the DC/DC converter decreases. Thus, the converting efficiency is improved. In particular, the second aspect of the present invention deals with the operation in the light load mode in which the load current is small. Thus, even if the current consumption is only slightly reduced, the converting efficiency is remarkably improved.

As described above, in the second aspect of the present invention, the operation mode is switched with a trigger for which a predetermined condition successively takes place n times. Thus, the operation mode can be prevented from being incorrectly switched due to noise or the like. In addition, the condition for switching the operation mode can be easily designated to a desired value.

The circuit that calculates the load current in the light load mode and the circuit that determines the mode switching point are composed of a comparator and a gate circuit that do not consume much current, accordingly the total current consumption of the DC/DC converter decreases. In addition, since the sizes of such circuits are small, they do not require a large space on a chip.

Next, the third aspect of the present invention will be described. The third aspect is a structure in which the operation mode of the DC/DC converter is switched from the heavy load mode to the light load mode.

As described above, the current required by a load varies corresponding to the operation state of the load. In the case of a portable terminal, when keys are operated, the current consumption is relatively small. However, when a disk is accessed, the current consumption is large. Thus, while the DC/DC converter is operating in the light load mode, if the disk is accessed and thereby the load current increases, as described in the second aspect, the operation mode of the DC/DC converter is switched from the light load mode to the heavy load mode. However, after the disk accessing operation is finished, the load current decreases. When the load current is small, the power converting efficiency in the light load mode is higher than that in the heavy load mode. Thus, when the load current decreases, it is preferable to return the operation mode of the DC/DC converter to the light load mode.

While the DC/DC converter according to the third aspect of the present invention is operating in the heavy load mode, when the load current decreases to a level for the light load mode, the operation mode is switched from the heavy load mode to the light load mode. In other words, the DC/DC converter corresponding to the third aspect of the present invention monitors the coil current that varies corresponding to the control in the heavy load mode. When the average value of the coil current decreases to the maximum current or less for the light load mode, the operation mode is switched from the heavy load mode to the light load mode.

Figure 14:
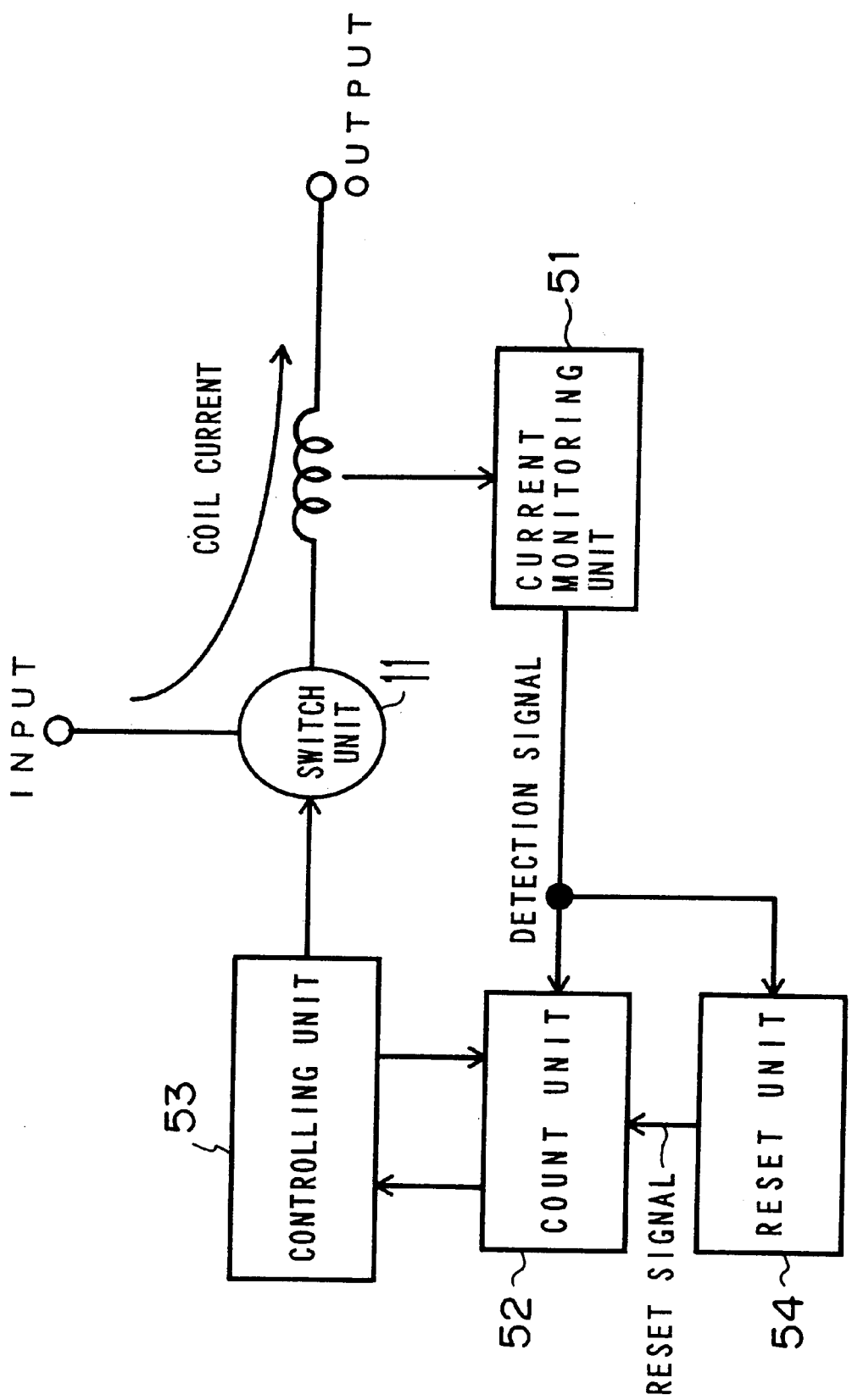
FIG. 14 is a block diagram showing a structure of a DC/DC converter according to a third aspect of the present invention.

FIG. 14 is a block diagram showing a structure of a DC/DC converter according to the third aspect of the present invention. As with the first aspect and the second aspect, the DC/DC converter according to the third aspect controls a switch unit 11 so as to vary the coil current and control the output.

A current monitoring unit 51 is, for example, a comparator. The current monitoring unit 51 compares a coil current in the heavy load mode with a predetermined current value. When the coil current decreases to the predetermined current value, the current monitoring unit 51 outputs a detection signal. A count unit 52 counts the number of times the detection signal is received from the current monitoring unit 51. A controlling unit 53 switches the operation mode of the DC/DC converter from the heavy load mode to the light load mode when the count value of the count unit 52 reaches a predetermined value. A reset unit 54 resets the count unit 52 when the coil current which varies corresponding to a control in the heavy load mode becomes higher than the predetermined value.

While the DC/DC converter is operating in the heavy load mode, the coil current has a ramp-shaped waveform (the current value linearly increases to a peak and then linearly decreases to bottom). Thus, the coil current varies in a predetermined period. When the coil current decreases as the load current decreases, the lowest (bottom) value of the coil current reaches a predetermined current value (for example, 0). Thus, the coil current repeatedly intersects with the predetermined current value.

The current monitoring unit 51 outputs the detection signal whenever the coil current intersects with the predetermined current value. The count unit 52 counts the number of times the detection signal is output. When the count value becomes the predetermined value, the operation mode is switched from the heavy load mode to the light load mode. In other words, when the state in which the coil current is very small continues for a predetermined time period, the operation mode is switched from the heavy load mode to the light load mode.

Even if the coil current decreases to the state in which the coil current is very small in the heavy load mode, when the state does not continue for the predetermined time period, the reset unit 54 resets the count unit 52. Thus, the operation mode is not switched. Consequently, in the heavy load mode, even if the coil current value instantaneously decreases, the operation mode is not switched to the light load mode.

Figure 15:
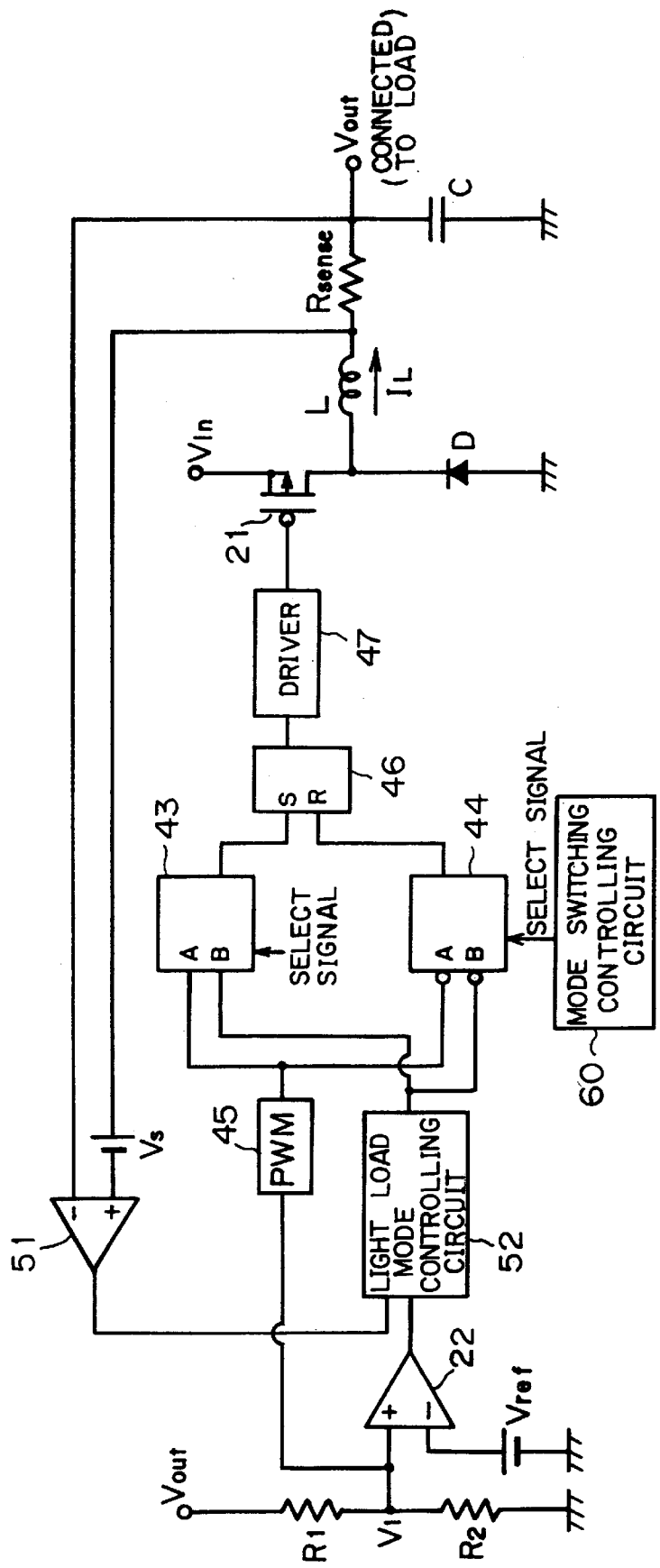
FIG. 15 is a circuit diagram showing a structure of a DC/DC converter according to an embodiment of the third aspect of the present invention.

FIG. 15 is a circuit diagram showing a structure of a DC/DC converter according to an embodiment of the third aspect of the present invention. In FIG. 15, similar portions to those in FIG. 9 are denoted by similar reference numerals.

The DC/DC converter shown in FIG. 15 converts an input voltage $V_{in}$ into an output voltage $V_{out}$. The DC/DC converter has two operation modes—the heavy load mode that operates when the current consumption of the connected load is large, and the light load mode that operates when the current consumption of the connected load is small. These operation modes are automatically switched corresponding to the variation of the load current by an internal control. Next, the operation for switching the operation mode of the DC/DC converter from the heavy load mode to the light load mode due to a decrease in the load current will be described.

The structures of a switching device 21, a comparator 22, selectors 43 and 44, a flip-flop 46, and a driver 47 shown in FIG. 15, are the same as those described in the first aspect and the second aspect. For simplicity, the description of these portions is omitted.

A comparator 51 has the same function as the comparator 23 shown in FIG. 4 (or the comparators 25 and 26 shown in FIG. 9). In other words, the comparator 51 monitors a coil current $I_L$ in the light load mode. When the coil current $I_L$ reaches a comparison level $I_{LP}$ and the coil current $I_L$ becomes 0, the comparator 51 sends a signal representing this state to a light load mode controlling circuit 52.

The light load mode controlling circuit 52 performs the same operations as those described in the first aspect and the second aspect. An output signal of the light load mode controlling circuit 52 is sent to a terminal B of the selector 43. In addition, an inverted signal of the output signal of the light load mode controlling circuit 52 is sent to a terminal B of the selector 44. The output signal of the light load mode controlling circuit 52 is selected by the selectors 43 and 44 when the operation mode of the DC/DC converter is the light load mode.

A PWM controlling circuit 45 has an oscillator and outputs a signal with duty cycle which is controlled such that the output voltage $V_{out}$ remains constant. An output signal of the PWM controlling circuit 45 is sent to a terminal A of the selector 43. In addition, an inverted signal of the output signal of the PWM controlling circuit 45 is sent to a terminal A of the selector 44. The output signal of the PWM controlling circuit 45 is selected by the selectors 43 and 44 in the heavy load mode.

A mode switching controlling circuit 60 causes the operation mode of the DC/DC converter to be switched and sends a select signal to the selectors 43 and 44. In other words, the mode switching controlling circuit 60 monitors the coil current $I_L$ and determines whether or not to switch the operation mode of the DC/DC converter from the heavy load mode to the light load mode. When the operation mode is switched from the heavy load mode to the light load mode, the signal level of the select signal is changed from "H" to "L". When the signal level of the selector signal becomes "L", each of the selectors 43 and 44 selects a signal that is input to the terminal B. In other words, when the signal level of the select signal changes from "H" to "L", each of the selectors 43 and 44 selects the output signal of the light load mode controlling circuit 52. The switching device 21 is driven corresponding to the selected signal. Thus, the DC/DC converter operates in the light load mode. When the operation mode of the DC/DC converter is switched from the heavy load mode to the light load mode, the mode switching controlling circuit 60 can stop the operation of the oscillator in the PWM controlling circuit 45.

Figure 16:
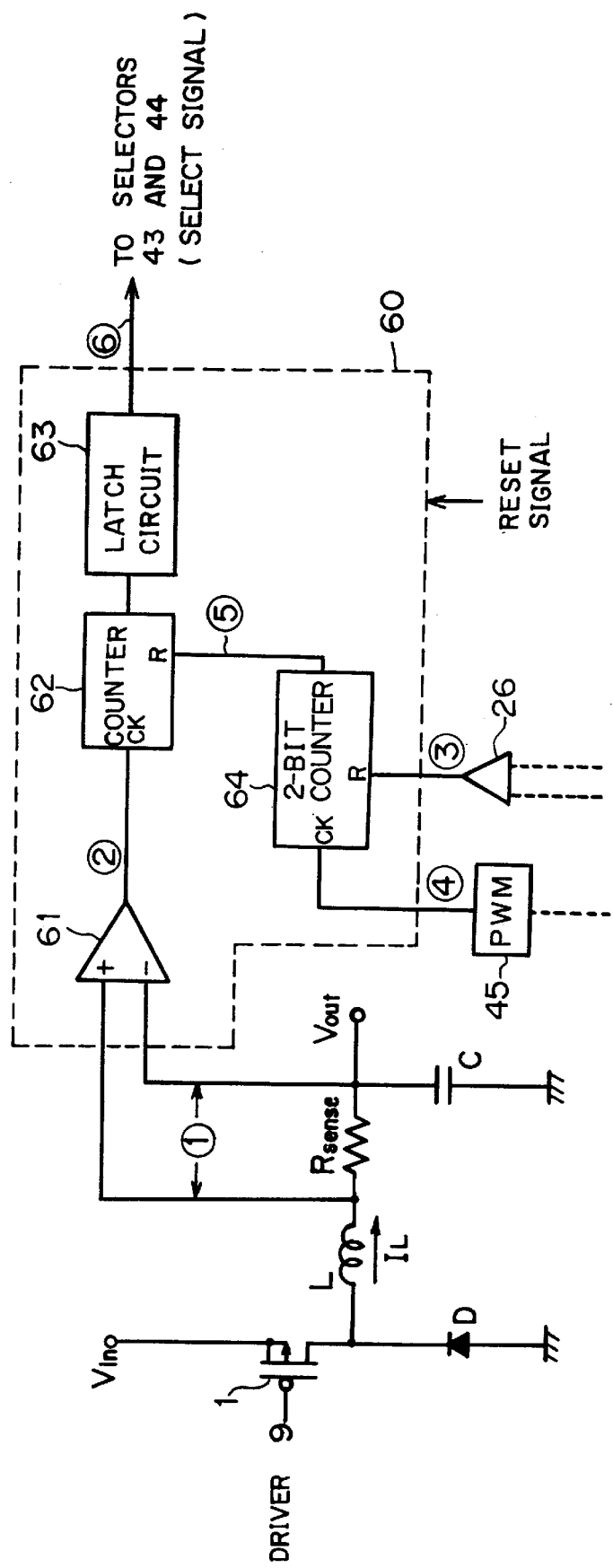
FIG. 16 is a circuit diagram showing a mode switching controlling circuit and peripheral circuits thereof.

FIG. 16 is a circuit diagram showing the mode switching controlling circuit 60 and peripheral circuits thereof.

A comparator 61 detects a voltage difference between both terminals of a resistor Rsense so as to monitor the coil current $I_L$. When the coil current $I_L$ flows from the input side to the output side, the signal level of the output signal of the comparator 61 becomes "H". When the coil current $I_L$ is 0 or flows from the output side to the input side, the signal level of the output signal of the comparator 61 becomes "L".

When the operation mode of the DC/DC converter is switched corresponding to the load current, the load current may be directly detected. However, in this case, a resistor should be disposed on the output side of a condenser C. Thus, the overall efficiency of the DC/DC converter deteriorates. To prevent this problem, in the embodiment, with the resistor Rsense disposed on the input side (the primary side) of the condenser C, the load current (the average value of the coil current $I_L$) is estimated. The resistor Rsense is disposed so as to protect the circuit from an overcurrent and to maintain the output voltage constant. Thus, it is not necessary to newly provide a resistor for detecting the load current.

A counter 62 receives the output signal of the comparator 61 and increments when it detects a trailing edge. When the count value becomes "n" (where n is an integer), the counter 62 outputs a pulse. The counter 62 is reset when the operation mode of the DC/DC converter is switched from the light load mode to the heavy load mode.

When a latch circuit 63 receives a pulse from the counter 62, the latch circuit 63 latches the signal level "L" until the counter 62 is reset. The reset signal causes the operation mode of the DC/DC converter to be switched from the light load mode to the heavy load mode. The reset signal is generated by, for example, the mode switching controlling circuit 49 described in the second aspect of the present invention. When the latch circuit 63 receives the reset signal, it latches the signal level "H". When the reset signal conflicts with the pulse signal received from the counter 62, the latch circuit 63 operates corresponding to the reset signal. An output signal of the latch circuit 63 is sent as a select signal to the selectors 43 and 44.

2-bit counter 64 receives an output signal of the PWM controlling circuit 45 and counts up every time a trailing edge is detected. When the count value of the 2-bit counter 64 becomes "2", the output signal level of it becomes "H". The counter 62 is reset when the signal level of output signal of the 2-bit counter 64 becomes "H". The 2-bit counter 64 is reset, when the signal level of output signal of the comparator 26 shown in FIG. 9 becomes "H".

Figure 17:
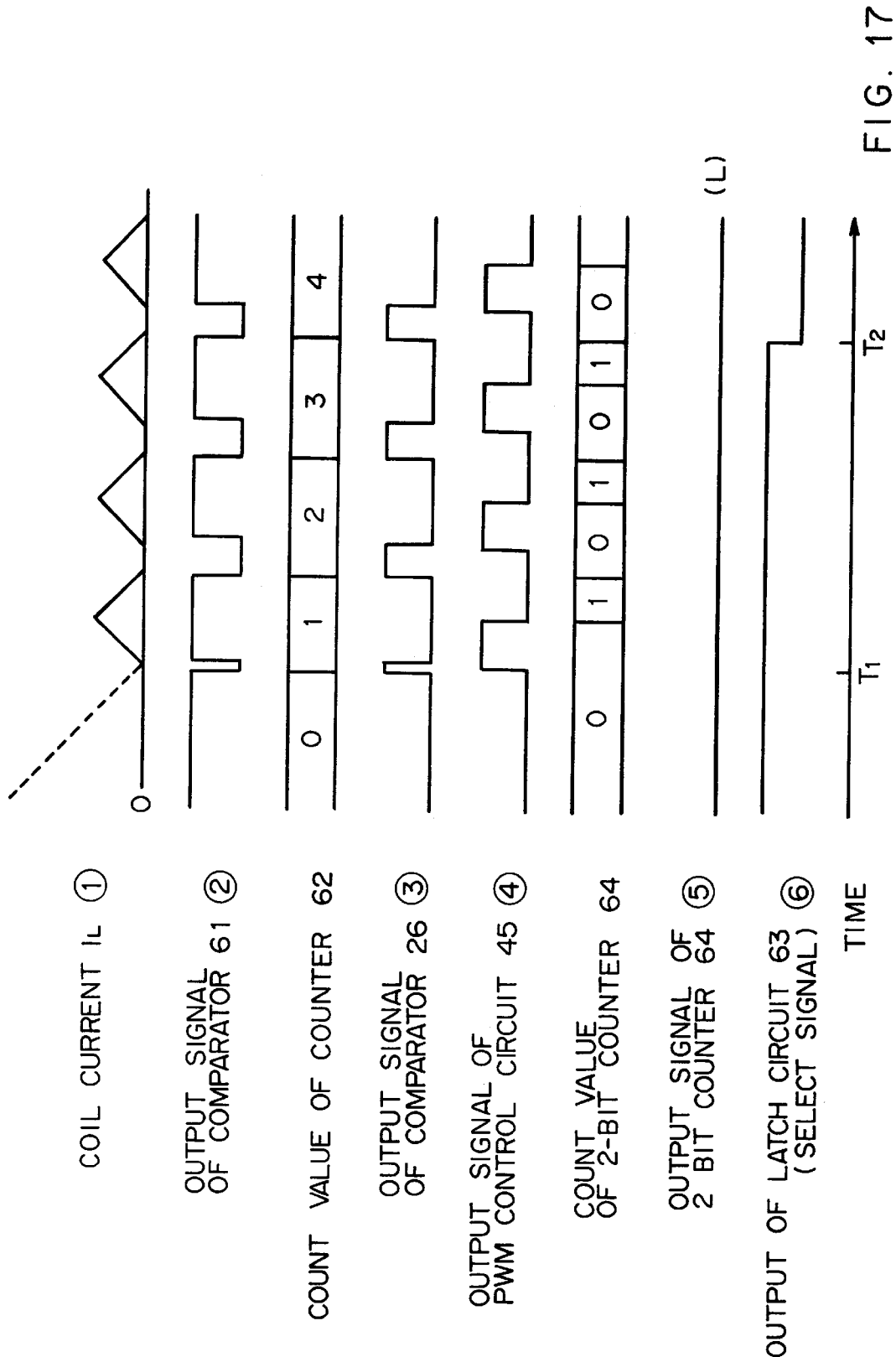
FIG. 17 is a timing chart for explaining an operation of the DC/DC converter shown in FIG. 16.

Next, with reference to a timing chart, the operation of the DC/DC converter according to the third aspect of the present invention will be described. FIG. 17 is a timing chart for explaining the operation for switching the operation mode of the DC/DC converter from the heavy load mode to the light load mode.

Before time T1, the load current is large. Thus, the DC/DC converter operates in the heavy load mode. Now, assume that the count value of the counter 62 is 0.

In the heavy load mode, the coil current $I_L$ has a ramp-shaped waveform. In other words, the coil current $I_L$ linearly increases while the switching device 21 is in the on state. The coil current $I_L$ linearly decreases while the switching device 1 is in the off state. The period of the coil current $I_L$ depends on the operating frequency of the PWM controlling circuit 45.

While the load current is large, the coil current always varies with a value larger than 0. Consequently, the signal level of the output signal of the comparator 61 is still "H". The count value of the counter 62 is still "0".

In this state, when the load current decreases, the output voltage $V_{out}$ varies. The PWM controlling circuit 45 varies the duty of the output pulse so that the output voltage $V_{out}$ is kept constant. When the output voltage $V_{out}$ increases, the PWM controlling circuit 45 temporarily decreases the duty cycle of the output pulse so as to decrease an average of coil current $I_L$. When the output voltage $V_{out}$ returns to a predetermined value, the duty cycle is back to the value of $V_{out}/V_{in}$.

Figure 18A:
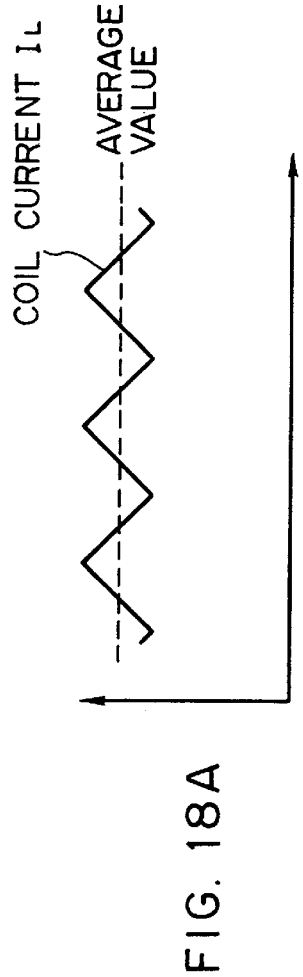
FIGS. 18A to 18D are schematic diagrams showing a coil current decreasing sequence in a PWM method.
Figure 18B:
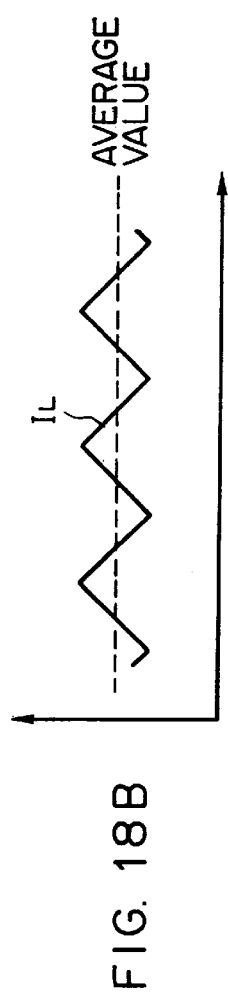
Figure 18C:
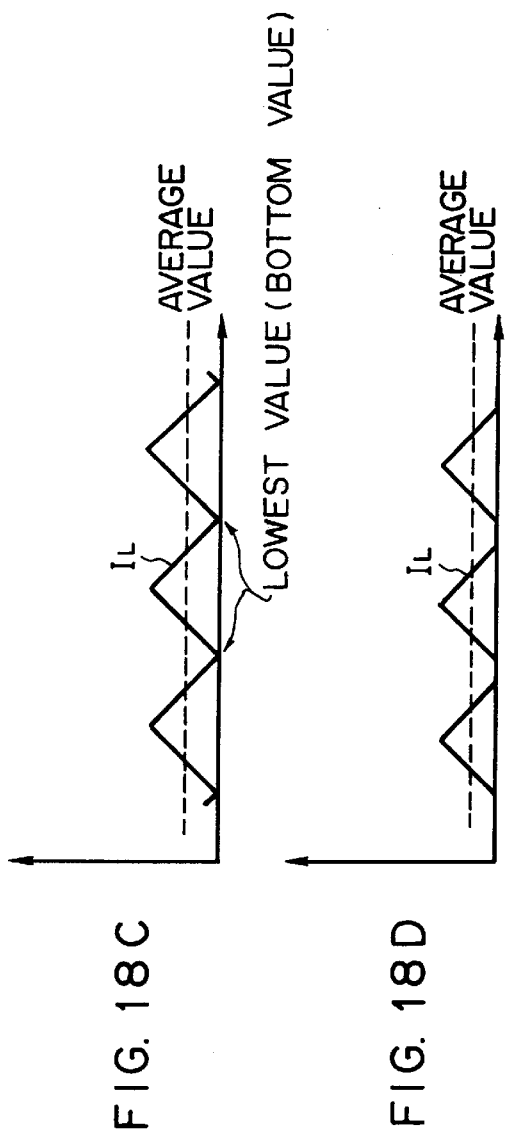

FIGS. 18A to 18D are schematic diagrams showing a coil current decreasing sequence in a PWM method. When the load current decreases, the PWM controlling circuit 45 controls the duty cycle of the output pulse signal so that the output voltage $V_{out}$ remains constant, then the average of the coil current $I_L$ decreases, as shown in FIGS. 18A to 18C. When the load current decreases to a predetermined current value, a bottom value (lowest value) of the coil current $I_L$ becomes 0. The load current (an average of coil current $I_L$) at the timing shown in FIG. 18C is the same as the maximum supply current in the light load mode explained in the second aspect of the present invention.

Figure 18D:
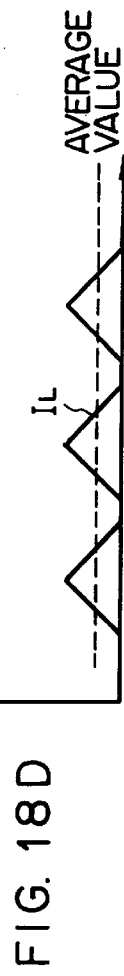

When the load current further decreases, the average of the coil current $I_L$ should be more smaller. In this case, as shown in FIG. 18D, there are time periods in which the coil current $I_L$ is 0. The load current at this case is smaller than the average of the coil current $I_L$ shown in FIG. 18C, the DC/DC converter can supply the load current in the light load mode explained in the second aspect of the present invention. When the load current (the average value of the coil current $I_L$) decreases to a level at which the load current can be supplied in the light load mode, it is preferable to switch the operation mode of the DC/DC converter to the light load mode so as to reduce the losses and improve the converting efficiency.

When the load current is larger than that shown in FIG. 18C, the DC/DC converter according to the embodiment is operated in the heavy load mode. When the load current is smaller than that shown in FIG. 18C, the DC/DC converter is operated in the light load mode.

Returning to FIG. 17, when the coil current $I_L$ gradually decreases and the bottom (lowest) value becomes 0 at time T1, the signal level of the output signal of the comparator 61 becomes "L". When the counter 62 detects the trailing edge of the output signal of comparator 61 at that time, the count value of the counter 62 is counted up from 0 to 1.

After time T1, everytime the bottom (lowest) value of the coil current $I_L$ becomes 0, comparator 61 outputs "L", and the count value of the counter 62 is counted up by the trailing edge of the output signal from the comparator 61.

2-bit counter 64, after time T1, repeats a count-up operation caused by the detection of a trailing edge of the output signal from the PWM controlling circuit 45 and a reset operation caused by receiving "H" from the comparator 26 in turn. Then, the count value of the 2-bit counter 64 is 0 or 1. Consequently, since the signal level of the output signal of the 2-bit counter 64 remains "L", the counter 62 is not reset, and the counter value of the counter 62 is counted up sequentially by the trailing edge of the output signal from the comparator 61.

At time T2, when the count value of the counter 62 becomes "4", the counter 62 outputs a pulse to the latch circuit 63. When the latch circuit 63 receives the pulse, the signal level of the output signal of the latch circuit 63 changes from "H" to "L". Thereafter, the signal level of the output signal of the latch circuit 63 is kept "L" until the counter 62 is reset. The output signal of the latch circuit 63 is sent as a select signal to the selectors 43 and 44.

When the signal level of the select signal received from the mode switching controlling circuit 60 becomes "L", each of the selectors 43 and 44 selects a signal that is input to the terminal B (namely, the signal generated by the light load mode controlling circuit 52) and outputs the selected signal. Thus, the switching device 21 is turned on/off corresponding to the signal generated by the light load mode controlling circuit 52. Consequently, the operation mode of the DC/DC converter is switched to the light load mode.

As described above, in the heavy load mode, when the load current decreases, the coil current $I_L$ decreases. When the counter 62 receives a predetermined number of trailing edges (for example, four) of the output signal from the comparator 61, the operation mode of the DC/DC converter is automatically switched from the heavy load mode to the light load mode.

Figure 19:
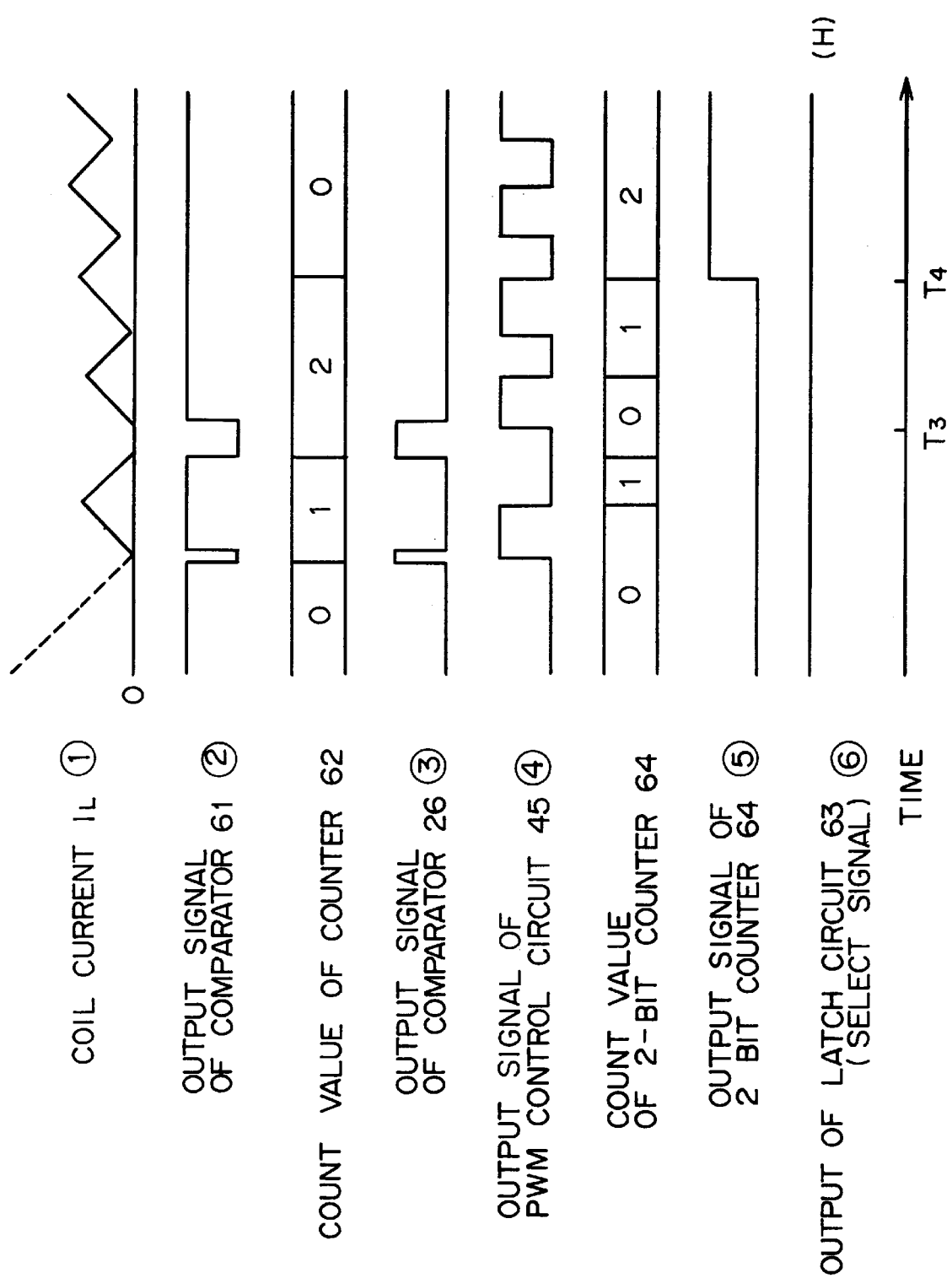
FIG. 19 is a timing chart for explaining an operation of the DC/DC converter shown in FIG. 16.

FIG. 19 is a timing chart for explaining the operation in the case that the counter 62 is reset in the heavy load mode.

As with the operation after time T1 described with reference to FIG. 17, the comparator 61 outputs a pulse. The counter 62 increments the count value as "0", "1", and "2". After time T3, the load current increases. In this case, the DC/DC converter increases the duty cycle of the output pulse of the PWM controlling circuit 45 so as to keep the output voltage $V_{out}$ at a constant value, thereby increasing the coil current $I_L$. The coil current $I_L$ is always larger than 0. In other words, the bottom. (lowest) value of the coil current $I_L$ does not decrease to 0. Thus, after time T3, the comparator 61 does not output a pulse. Consequently, the count value of the counter 62 is still "2".

After time T3, the 2-bit counter 64 is not reset since a signal level of the output signal of the comparator 26 does not become "H". However, the 2-bit counter 64 receives the trailing edges of the output signal of PWM controlling circuit 45, and counts up the count value thereof. When the count value of the 2-bit counter 64 becomes "2" at time T4, the 2-bit counter 64 outputs "H". Then, the counter 62 is reset, when the signal level of the output signal of the 2-bit counter 64 becomes "H".

In the heavy load mode, even if the lowest (bottom) value of the coil current $I_L$ becomes 0 and thereby the counter 62 starts counting the trailing edges of the output signal from the comparator 61, when the coil current $I_L$ increases in a predetermined time period, the counter 62 is reset. Thus, when the coil current $I_L$ does not satisfactorily decrease, even if the count value is incorrectly incremented due to noise in the coil current $I_L$, the count value of the counter 62 returns to 0. In other words, according to the embodiment, the operation mode can be prevented from being incorrectly switched due to noise or other factors.

FIG. 20 is a circuit diagram showing another structure of the mode switching controlling circuit. The difference between these structures is in that an offset voltage $V_{os}$ is supplied to a terminal + of a comparator 61 shown in FIG. 20.

FIGS. 21A and 21B are schematic diagrams showing input/output signals of the comparator 61 in the structure shown in FIG. 20. As shown in FIG. 21A, when the coil current $I_L$ becomes 0, the voltage of the input signal at the terminal + of the comparator 61 is lower than that at the terminal—by the offset voltage $V_{os}$. In other words, when the input voltage of the comparator 61 is 0, the value of the coil current $I_L$ becomes $I_m$ (>0). Thus, when the coil current $I_L$ decreases to $I_m$ or less, the signal level of the output signal of the comparator 61 becomes "L".

In such a structure, when the bottom (lowest) value of the coil current $I_L$ becomes 0, since the pulse width of the pulse that is output from the comparator 61 becomes wide, the counter 62 accurately detects the pulse.

In the above-described structure, as shown in FIG. 21B, when the bottom value of the coil current $I_L$ decreases to $I_m$ or less, the signal level of the output signal of the comparator 61 becomes "L". The counter 62 counts the pulses generated at this time. The operation mode of the DC/DC converter is switched corresponding to the count value. Thus, the switching point of the operation mode can be designated corresponding to the offset voltage $V_{os}$ (the current value $I_m$).

As described above, in the third aspect of the present invention, when the state in which the coil current decreases continues for a predetermined time period, the operation mode of the DC/DC converter is switched. Thus, the operation mode is prevented from being incorrectly switched due to noise or the like. In addition, the condition for switching the operation mode can be easily designated to any value. Moreover, since the means for determining whether or not the operation mode should be switched is composed of a circuit of a low current consumption type, the total efficiency of the DC/DC converter does not deteriorate.

In the second and third aspects of the present invention, the PWM controlling method was described as the heavy load mode. However, the present invention is not limited to such a method. Instead, a PFM controlling method can be used.

In the first to third aspects of the present invention, a voltage-drop type DC/DC converter was described. However, the present invention is not limited to such a type. Instead, the present invention can be applied for a voltage-rise type DC/DC converter and an inversion type DC/DC converter.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A DC/DC converter for controlling switching means so as to vary a coil current and control an output, the converter comprising:

output monitoring means for monitoring an output value and outputting a first signal when the output value becomes a reference value;

current monitoring means for monitoring a coil current, outputting a second signal when the coil current becomes a first current value and outputting a third signal when the coil current becomes a second current value; and controlling means for receiving the first, second and third signals, wherein the controlling means turns on the switching means when the first signal is received and turns off the switching means when the second signal is received, wherein said controlling means is adapted for ignoring the first signal that is output from said output monitoring means after the first signal is received until the third signal is received.

2. The DC/DC converter as set forth in claim 1, wherein said current monitoring means is composed of a hysteresis comparator.

3. The DC/DC converter as set forth in claim 1, wherein said current monitoring means is composed of two comparators.

4. The DC/DC converter as set forth in claim 1, wherein the second current value is 0.

5. The DC/DC converter as set forth in claim 1, wherein at least a heavy load mode and a light load mode are provided as operation modes for supplying a power to a load, the switching means being controlled corresponding to each of the heavy load mode and the light load mode, and wherein the period after the first signal is output until the third signal is output is a power supply cycle in the light load mode, the operation mode being switched from the light load mode to the heavy load mode when a predetermined number of the power supply cycles are successively performed.

6. The DC/DC converter as set forth in claim 1, wherein at least a heavy load mode and a light load mode are provided as operation modes for supplying a power to a load, the switching means being controlled corresponding to each of the heavy load mode and the light load mode, wherein the period after the first signal is output until the third signal is output is a power supply cycle in the light load mode, and wherein the DC/DC converter further comprises:

voltage comparing means for comparing an output voltage with a predetermined voltage;

counting means for counting the number of the power supply cycles in the light load mode during the period the output voltage is lower than the predetermined voltage; and controlling means for switching the operation mode from the light load mode to the heavy load mode when the count value of said counting means reaches a predetermined value.

7. The DC/DC converter as set forth in claim 6, further comprising:

resetting means for resetting said counting means when said voltage comparing means has determined that the output voltage is higher than the predetermined voltage.

8. A DC/DC converter for controlling switching means so as to vary a coil current and control an output, comprising:

first switch controlling means for turning on the switching means when an output voltage decreases to a reference value;

second switch controlling means for turning off the switching means when the coil current increases and exceeds a first threshold value; and controlling means for controlling said first switch controlling means to prevent said first switch controlling means from controlling the switching means when the coil current decreases to a second threshold value that is smaller than the first threshold value and the output voltage is higher than the reference value.

9. A DC/DC converter having at least a light load mode and a heavy load mode as operation modes for supplying a power to a load, the converter comprising:

an output which is controlled corresponding to each operation mode; and controlling means for controlling whether the output is at the light load mode or the heavy load mode, wherein the controlling means switches the operation mode at the output from the light load mode to the heavy load mode when a predetermined number of power supply cycles in the light load mode are successively performed.

10. A DC/DC converter having at least a light load mode and a heavy load mode as operation modes for supplying a power to a load, the converter comprising:

an output which is controlled corresponding to each operation mode;

voltage comparing means for comparing an output voltage with a predetermined voltage;

counting means for counting the number of the power supply cycles in the light load mode during the period the output voltage is lower than the predetermined voltage; and controlling means for switching the operation mode from the light load mode to the heavy load mode when the count value of said counting means reaches a predetermined value.

11. The DC/DC converter as set forth in claim 10, further comprising:
resetting means for resetting said counting means when said voltage comparing means has determined that the output voltage is higher than the predetermined voltage.

12. A DC/DC converter having at least a heavy load mode and a light load mode as operation modes for supplying a current to a load and varying a coil current corresponding to each operation mode so as to control an output,
wherein an operation mode is switched from the heavy load mode to the light load mode when a lowest value of a coil current that varies corresponding to a control in the heavy load mode reaches a predetermined current value for a predetermined number of times.

13. A DC/DC converter having at least a heavy load mode and a light load mode as operation modes for supplying a current to a load and varying a coil current corresponding to each operation mode so as to control an output, comprising:
comparing means for comparing a coil current that varies corresponding to a control in the heavy load mode with a predetermined current value and outputting a detection signal when the coil current reaches the predetermined current value;
counting means for counting the number of times the detection signal is received from said comparing means; and
controlling means for switching an operation mode from the heavy load mode to the light load mode when the count value of said counting means reaches a predetermined value.

14. The DC/DC converter as set forth in claim 13, further comprising:
resetting means for resetting said counting means when the coil current that varies corresponding to a control in the heavy load mode becomes higher than the predetermined current value.

15. A DC/DC converter for controlling a switch so as to vary a coil current and control an output, the converter comprising:
a first monitoring circuit which monitors an output value and outputs a first signal when the output value becomes a reference value;
a second monitoring circuit which monitors the coil current, outputs a second signal when the coil current becomes a first current value, and outputs a third signal when the coil current becomes a second current value; and
a controller which receives the first, second and third signal, wherein the controller turns on the switch when the first signal is received and turns off the switch when the second signal is received,
wherein the controller is adapted for ignoring the first signal after the first signal is received until the third signal is received.

16. A method for controlling a DC/DC converter which controls a switch so as to vary a coil current and control an output, the method comprising:
generating a first signal when an output value becomes a reference value;
generating a second signal when the coil current becomes a first current value;
generating a third signal when the coil current becomes a second current value;
turning on the switch when the first signal is received;
turning off the switch when the second signal is received; and
ignoring the first signal after the first signal is received until the third signal is received.

17. A DC/DC converter for controlling a switch so as to vary a coil current and control an output, the converter comprising:
a first controller which turns on the switch when an output voltage decreases to a reference value;
a second controller which turns off the switch when the coil current increases to a first threshold value;
a third controller which controls the first controller to prevent the first controller from controlling the switch when the coil current decreases to a second threshold value that is smaller than the first threshold value and the output voltage is higher than the reference value.

18. A method for controlling a DC/DC converter which controls a switch so as to vary a coil current and control an output, the method comprising:
turning on the switch when an output voltage decreases to a reference value;
turning off the switch when the coil current increases to a first threshold value; and
preventing the switch from being turned on when the coil current decreases to a second threshold value that is smaller than the first threshold value and the output voltage is higher than the reference value.

19. A DC/DC switching converter having at least a light load mode and a heavy load mode as operation modes for supplying a power to a load, the converter comprising:
an output which is controlled corresponding to each operation mode; and
a controller which controls whether the output is at the light load mode or the heavy load mode, wherein the controller switches the operation mode from the light load mode to the heavy load mode when a predetermined number of power supply cycles in the light load mode are successively performed.

20. A method for controlling a DC/DC switching converter having at least a light load mode and a heavy load mode as operation modes for supplying a power to a load, the method comprising:
controlling an output of the converter corresponding to each operation mode; and
switching the operation mode from the light load mode to the heavy load mode when a predetermined number of power supply cycles in the light load mode are successively performed.

21. A DC/DC switching converter having at least a light load mode and a heavy load mode as operation modes for supplying a power to a load, pulse frequency modulation being used in the light load mode, an output of the DC/DC switching converter being controlled corresponding to each operation mode, the converter comprising:
a detector which detects the number of power supply cycles performed in the light load mode; and
a controller which switches the operation mode from the light load mode to the heavy load mode according to the number of power supply cycles detected by the detector.

22. The converter according to claim 26, wherein the controller switches the operation mode only when an output voltage is lower than a predetermined value.

23. A DC/DC switching converter having at least a light load mode and a heavy load mode as operation modes for supplying a power to a load, an output of the DC/DC switching converter being controlled corresponding to each operation mode, the converter comprising:

a first generator which generates a first control signal used in the light load mode;

a second generator which generates a second control signal used in the heavy load mode;

a switch which supplies or intercepts power to the load according to one of the first and second control signals;

a detector which detects a condition of a coil ripple current; and a selector which selects one of the first and second control signals to be output to the switch according to the condition detected by the detector.

24. A method for controlling a DC/DC switching converter having at least a light load mode and a heavy load mode as operation modes for supplying a power to a load, an output of the DC/DC switching converter being controlled corresponding to each operation mode, the method comprising:

generating a first control signal used in the light load mode;

generating a second control signal used in the heavy load mode;

detecting a condition of a coil ripple current; and selecting one of the first and second control signals to be output to a switch, which supplies or intercepts power to the load according to the selected control signal, on the basis of the condition detected by the detector.

25. A DC/DC switching converter having at least a light load mode and a heavy load mode as operation modes for supplying power to a load, an output of the DC/DC switching converter being controlled corresponding to each operation mode, the converter comprising:

a comparator which compares a coil ripple current that varies corresponding to a control in the heavy load mode with a predetermined value; and a detector which detects a condition that a lowest value of the coil ripple current in a power supply cycle reaches the predetermined value in the heavy load mode, wherein an operation mode is switched from the heavy load mode to the light load mode when the detector detects the condition for a predetermined number of times.

26. The DC/DC switching converter according to claim 25, wherein the predetermined number of times is a natural number equal to or more than one.

27. The DC/DC switching converter according to claim 25, wherein the detector includes a counter.

28. The DC/DC switching converter according to claim 25, wherein the DC/DC switching converter is a synchronous rectifying DC/DC converter.

29. The DC/DC switching converter according to claim 25, wherein the predetermined value is substantially zero.

30. The DC/DC switching converter according to claim 25, wherein pulse width modulation is used in the heavy load mode.

31. The DC/DC switching converter according to claim 25, wherein the converter has a switching frequency and the switching frequency in the light load mode is lower than the switching frequency in the heavy load mode.

32. The DC/DC switching converter according to claim 25, wherein pulse frequency modulation is used in the light load mode.

33. A DC/DC switching converter having at least a light load mode and a heavy load mode as operation modes for supplying a power to a load, an output of the DC/DC switching converter being controlled corresponding to each operation mode, the converter comprising:

a comparator which compares a coil ripple current that varies corresponding to a control in the heavy load mode with a predetermined value; and a detector which detects a lowest value of the coil ripple current in a power supply cycle, wherein an operation mode is switched from the heavy load mode to the light load mode when the detector detects a condition that the lowest value of the coil ripple current in the heavy load mode reaches the predetermined value at least one time.

34. A DC/DC switching converter having at least a heavy load mode and a light load mode as operation modes for supplying a power to a load, pulse width modulation being used in the heavy load mode, an output of the DC/DC switching converter being controlled corresponding to each operation mode, the converter comprising:

a detector which detects a lowest value of the coil ripple current in each power supply cycle in the heavy load mode; and a controller which switches an operation mode from the heavy load mode to the light load mode according to the lowest value detected by the detector.

35. A DC/DC switching converter having at least a light load mode and a heavy load mode as operation modes for supplying a power to a load, an output of the DC/DC switching converter being controlled corresponding to each operation mode, the converter comprising:

a comparing circuit which compares a coil ripple current that varies corresponding to a control in the heavy load mode with a predetermined value; and a detecting circuit which detects a condition that a lowest value of the coil ripple current in a power supply cycle reaches the predetermined value in the heavy load mode, wherein an operation mode is switched from the heavy load mode to the light load mode when the detecting circuit detects the condition for a predetermined number of times.

36. A method for controlling a DC/DC switching converter having at least a light load mode and a heavy load mode as operation modes for supplying a power to a load, an output of the DC/DC switching converter being controlled corresponding to each operation mode, the method comprising:

comparing a coil ripple current that varies corresponding to a control in the heavy load mode with a predetermined value;

detecting a condition that a lowest value of the coil ripple current in a power supply cycle reaches the predetermined value in the heavy load mode; and switching an operation mode from the heavy load mode to the light load mode when the condition is detected for a predetermined number of times.

* * * * *

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

On the Cover Page:

Item [73], change "Seisakush" to "Seisakusho".

Item [56], insert the following after the U.S. Patent Documents listed on page 2 of the Cover Page:

Other Documents

EDN, Blanchard et al., MOSFETs, Schottky diodes vie for low-voltage-supply designs, Jun. 28, 1984, pages 197-205

EDN, Williams, Use low-power design methods to condition battery outputs, Oct. 18, 1984, pages 307-318

EDN, Williams et al., Precise converter designs enhance system performance, Oct. 13, 1988, pages 175-185

Integrated Circuits Unitrode ("Advanced Information" Data Sheets), Synchronous Rectifier Buck PWM Controller, UC1895/ UC2895/ UC3895, Jan. 3, 1993, 5 pages Integrated Circuits Unitrode (Data Sheets), Synchronous Rectifier Buck PWM Controller, UC1895/ UC2895/ UC3895, Jan. 1993, 5 pages Dell Computer Corporation Introduces Advanced Notebook PC (News Release), Sep. 4, 1991

Sidney Soclof, Applications of Analog Integrated Circuits, 1985, pages 74-75

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

Maxim Integrated Products (Data Sheets), MAX746, Nov. 1993, pages 1-8

Maxim Integrated Products (Data Sheets), MAX747, Sept. 1993, pages 1-8

Maxim Integrated Products (Data Sheets), MAX767, Jan. 1994, pages 1-16

Maxim Integrated Products (Data Sheets), MAX767 EV Kit, 1994, pages 1-8

Maxim Integrated Products (Data Sheets), MAX782, May 1994, pages 1-32

Maxim Integrated Products (Data Sheets), MAX 786, May 1994, pages 1-24

Integrated Circuits Unitrode ("Preliminary" Data Sheets), High Efficiency, Synchronous, Step-down (Buck) Controllers, UC1874-1,-2/ UC2874-1,-2/ UC3874-1,-2, Feb. 1996, pages 1-8

Linear Technology Corporation, Linear Databook Supplement 1992, LT1432, pages 4-145 to 4-171

Linear Technology Magazine, Vol. II, No. 1, Feb. 1992, pages 1-5

Linear Technology Corporation, 1992 Linear Databook Supplement, LT1158, pages 4-101 to 4-121

Linear Technology, Williams, Application Note 35, Step Down Switching Regulators, Aug. 1989, pages AN35-1 to AN35-32

Linear Technology, Williams et al., Application Note 29, Some Thoughts On DC-DC Converters Oct. 1988, pages AN29-1 to AN29-44

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

Linear Technology ("Preliminary" Data Sheets), LTC1149, LTC1149-3.3/LTC1149-5, Nov. 1992, pages 1-16

Linear Technology ("Preliminary" Data Sheets), LTC1148/LTC1148-3.3/LTC1148-5, Nov. 1992, pages 1-16

Linear Technology, Visant, Design Note 48, No Design Switching Regulator 5V, 5A Buck (Step Down) Regulator, August 1991, 2 pages Linear Technology, Pietkiewicz et al., Design Note 52, DC-DC Converters For Portable Computers, July 1991, 2 pages Linear Technology Magazine, Vol. III, No. 1, Wilcox et al., New LTC1148/LTC1149 Switching Regulators Maximize Efficiency from Milliamps to Amps, Feb. 1993, pages 1, 10-12

EDN, Williams, Think carefully about your capacitors' requirements; you must account for all operating conditions, Jan. 18, 1990, pages 160-166

EDN, Williams et al., Proper instrumentation eases low-power dc/dc-converter design, Oct. 27, 1988, pages 285-291

EDN, Williams et al., Design dc/dc converters for power conservation and efficiency, Nov. 10, 1988, pages 209-218

EDN, Williams et al., Switched-capacitor networks simplify dc/dc converter designs, Nov. 24, 1988, pages 171-175

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

EDN, Williams, Galvanically isolated switching supplies provide high power, Nov. 26, 1987, pages 191-200

EDN, Williams, Regulator IC speeds design of switching power supplies, Nov. 12, 1987, pages 193-200

EDN, Williams, Astute designs improve efficiencies of linear regulators, Aug. 17, 1989, pages 151-158

EDN, Williams, Basic principles and ingenious circuits yield stout switchers, Jan. 18, 1990, pages 151-159

EDN, Visel, Use power FETs to design ac-line power choppers, Sep. 15, 1988, pages 191-200

EDN, Patel, Bipolar synchronous rectifiers cut supply losses, Apr. 4, 1985, pages 199-204

EDN, Williams, Correcting power-supply problems, Oct. 10, 1991, pages 181-190

EDN, Williams et al., Large-area devices may appear attractive because of their low saturation, but you must evaluate drive losses carefully, Nov. 10, 1988, pages 220-224

Electronic Engineering Times, Williams et al., Sustaining battery life, Jan. 25, 1993, page 42

EDN, Archer, Current drives synchronous rectifier, Nov. 28, 1985, page 279

EDN, Williams, Bridge forms synchronous rectifier, Mar. 8, 1984, page 242

EDN, LaBelle, Power isolators are bidirectoinal, June 8, 1989, pages 203, 205

EDN, Sherman, Five Volts powers negative 2W regulator, June 23, 1988, page 177

EDN, Gracie, Intermittent converter saves power, Sept. 1, 1989, page 151

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

EDN, Gajewski, Power MOSFETs yield efficient power supply, Nov. 28, 1985, page 287

EDN, Chater, MOSFETs provide low-loss rectification, Feb. 18, 1988, page 237

EDN, Huffman, Regulator accepts high or low input, Apr. 25, 1991, page 179

EDN, Huffman, Switcher boosts regulator's efficiency, Jan. 1989, page 204

IEEE Power Electronics Specialists Conference-1975, PESC '75 Record, Duca et al., Improved Single-Ended Regulated DC/DC Converter Circuit, pages 177-187

IEEE Power Electronics Specialists Conference-1977, PESC '77 Record, Massey et al., High Voltage Single-Ended DC/DC Converter, pages 156-159

18th Annual IEEE Power Electronics Specialists Conference, PESC 87 Record, Redl et al., Overload-Protection Methods For Switching-Mode DC/DC Converter: Classification, Analysis, and Improvements, 1987, pages 107-118

The Institute of Electronics, Information and Communication Engineers, Vol. J 74-B-I No.8, Sakai et al., Synchronous Rectifier Using Bipolar Transistor Driven by Current Transformer, Aug. 1991, pages 639-646 (with an English translation of the first paragraph on page 639)

IEEE, A New Synchronous Rectifier Using Bipolar Transistor Driven by Current Transformer, Sakai et al., 1992, pages 424-429

Siliconix (Data Sheets), S-42677-Rev. D, Feb. 14, 1995, pages 1-1 to 1-5

International Rectifier, Application Note AN 978, HV Floating MOS-Gate Driver Ics: A Typical Block Diagram, 1980, pages 1-3

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

International Rectifier, Application Note AN 978, <u>HV Floating MOS-Gate Driver Ics: Full Bridge With Current Mode Control,</u> 1980, pages 1-4

International Rectifier, Clemente et al., Application Note AN 978A, <u>HV Floating MOS-Gate Driver IC,</u> 1980, pages 1-12

HFPC, May 1992 Proceedings, Cassani et al., <u>Sophisticated Control IC Enhances 1MHz Current Controlled Regulator Performance,</u> pages 167-173

RCA Solid State Division, Linear integrated Circuits (Data Sheets), <u>High-Reliability Slash (/) Series, CA3094/...CA3094A/...CA3094B/...,</u> Oct. 1973, pages 1-12

IEEE Transactions on Aerospace and Electronic Systems, Vol. AES-22, No. 6, Lee et al., <u>Design of Switching Regulator with Combined FM and On-Off Control,</u> Nov. 1986, pages 725-731

Electronic Design, Goodenough, <u>Raise Switcher Efficiency Above 90%,</u> Jan. 21, 1993, pages 107-110

Electronic Design, Goodenough, <u>Design Custom BiCMOS Power/High-Voltage ICs,</u> Jul. 12, 1990, pages 43-49

HARRIS Semiconductor ("Preliminary" Data Sheet), HIP5060, <u>Power Control IC Single Chip Power Supply,</u> Jan. 1992, pages 1-3

IEEE, Mansmann et al., <u>Maximizing the Impact of Power IC's Via a Time-to-Market CAD Driven Power ASIC Strategy,</u> 1992, pages 23-27

Linear Technology (Data Sheet), <u>LT1158,</u> 1992, pages 4-102 to 4-121

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-identified patent and that said Letters Patent is hereby corrected as shown below:

National Semiconductor Corporation (Preliminary Data Sheet), LM1578/2578/3578 Switching Regulator, 1987, pages 1-195 to 1-207

APEC '92, Seventh Annual Applied Power Electronic Conference & Exposition (Feb. 23-27, 1992), Mansmann et al., Maximizing the Impact of Power IC's Via a Time-to Market CAD Driven Power ASIC Strategy, pages 23-27

HFPC, May 1992 Proceedings, Cassani et al., Sophisticated Control IC Enhances 1MHZ Current Controlled Regulator Performance, pages 167-173

Electronic Design, Goodenhough, Design Custom BICMOS Power/High-Voltages ICs, Jul. 12, 1990, pages 43-49

Integrated Circuits Unitrode (Data Sheet), UC1895/2895/3895, Jan. 1993, 5 pages

IEEE, Sokal et al., Control Algorithms and Circuit Designs for Optimally Flyback-Charging an Energy-Storage Capacitor, 1990, pages 295-301

Electronic Engineering, Applied Ideas, Jul. 1976, page 23

PESC, Gontowoki et al., Advanced New Integrated Circuits for Current-Mode Control, 1986, pages 341-352

PCI Oct. 1988 Proceedings, Borghi et al., Discontinuous Conduction Mode Power Switching Regulator IC, pages 31-42

UNITED STATES PATENT AND TRADEMARK OFFICE
CERTIFICATE OF CORRECTION

PATENT NO. : 5,949,226
DATED : September 7, 1999
INVENTOR(S) : Tanaka et al

It is certified that error appears in the above-indentified patent and that said Letters Patent is hereby corrected as shown below:

Column 3, line 15, change "timing" to --time--.

Column 16, line 50, after "counted" delete "are";
        line 51, delete "detected".

Column 21, line 10, delete "more".

In the Claims:

Column 26, line 63, change "26" to --21--.

Signed and Sealed this

Fourteenth Day of March, 2000

Attest:

Q. TODD DICKINSON

*Attesting Officer*      *Commissioner of Patents and Trademarks*